US012713132B2

(12) United States Patent
Tseng et al.

(10) Patent No.: US 12,713,132 B2
(45) Date of Patent: Aug. 18, 2026

(54) SENSOR HAVING OIS WITH AF FUNCTIONALITY DRIVING MODULE AND PHOTOGRAPHING DEVICE

(71) Applicant: LARGAN DIGITAL CO., LTD., Taichung City (TW)

(72) Inventors: Te-Sheng Tseng, Taichung City (TW); Hsiu-Yi Hsiao, Taichung City (TW)

(73) Assignee: LARGAN DIGITAL CO., LTD., Taichung City (TW)

(*) Notice: Subject to any disclaimer, the term of this patent is extended or adjusted under 35 U.S.C. 154(b) by 169 days.

(21) Appl. No.: 18/823,325

(22) Filed: Sep. 3, 2024

(65) Prior Publication Data

US 2025/0294254 A1 Sep. 18, 2025

(30) Foreign Application Priority Data

Mar. 15, 2024 (TW) ................................ 113109802

(51) Int. Cl.
*H04N 23/68* (2023.01)
*H04N 23/54* (2023.01)

(52) U.S. Cl.
CPC ........... *H04N 23/687* (2023.01); *H04N 23/54* (2023.01)

(58) Field of Classification Search
CPC ...... H04N 23/687; H04N 23/54; H04N 23/55; H04N 23/68; H04N 23/57; H04N 23/50; G03B 30/00; G03B 5/00; G03B 2205/0007; G03B 2205/0069
See application file for complete search history.

(56) References Cited

U.S. PATENT DOCUMENTS 11,412,112 B2 * 8/2022 Wade .................. H04N 23/687
12,425,711 B2 * 9/2025 Tseng .................... G02B 27/64
2024/0064404 A1 2/2024 Oh
2024/0361667 A1 * 10/2024 Park ........................ G03B 5/00
(Continued)

FOREIGN PATENT DOCUMENTS

CN 204903924 U 12/2015
JP 2010-015107 A 1/2010
(Continued)

OTHER PUBLICATIONS

UK Search and Examination Report dated Aug. 28, 2025 in application No. 2501789.8.

*Primary Examiner* — Kelly L Jerabek
(74) *Attorney, Agent, or Firm* — Maschoff Brennan

(57) ABSTRACT

An imaging lens module includes an optical component, an image sensor, first, second and third driving parts and a base. The image sensor corresponds to the optical component along an optical axis. The first and second driving parts are to drive the image sensor to move in two distinct directions perpendicular to the optical axis. The first driving part includes corresponding first coil and first magnet. The second driving part includes corresponding second coil and second magnet. The third driving part is to drive the image sensor to move in parallel with the optical axis. The third driving part includes corresponding third coil and third magnet in parallel with the optical axis. The base and the optical component correspond and are fixedly installed to each other. The first driving part and the second driving part are to cooperate to drive the image sensor to rotate around the optical axis.

22 Claims, 26 Drawing Sheets

(56) References Cited

U.S. PATENT DOCUMENTS

| | | | | |
|---|---|---|---|---|
| 2025/0016448 | A1* | 1/2025 | Jang | G03B 5/00 |
| 2025/0071423 | A1* | 2/2025 | Mireault | H04N 23/6812 |

FOREIGN PATENT DOCUMENTS

| | | |
|---|---|---|
| JP | 2014-137379 A | 7/2014 |
| JP | 2014-137380 A | 7/2014 |
| JP | 2015-055794 A | 3/2015 |
| JP | 2015-055795 A | 3/2015 |

* cited by examiner

SENSOR HAVING OIS WITH AF FUNCTIONALITY DRIVING MODULE AND PHOTOGRAPHING DEVICE

RELATED APPLICATIONS

This application claims priority to Taiwan Application 113109802, filed on Mar. 15, 2024, which is incorporated by reference herein in its entirety.

BACKGROUND

Technical Field

The present disclosure relates to an imaging lens module and an electronic device, more particularly to a sensor having OIS with AF functionality driving module and a photographing device applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

Mobile devices featuring optical systems often suffer from diminished photo quality due to hand tremors, and this problem is worsened by the trend towards lighter and slimmer designs that are typically operated with just one hand. Furthermore, the common use of mobile devices in indoor settings, where lighting may be insufficient, can further contribute to the problem of shaky hands. As the demand for photography has increased in recent years, the need for imaging lens modules with enhanced capabilities for autofocus (AF) and optical image stabilization (OIS) has become more critical. Consequently, developing an imaging lens module capable of more accurately controlling the movement of the image sensor to counteract hand tremors has become a pressing challenge in the industry.

SUMMARY

According to one aspect of the present disclosure, an imaging lens module includes an optical component, an image sensor, a first driving part, a second driving part, a third driving part and a base. The optical component has an optical axis. The image sensor is disposed corresponding to the optical component along the optical axis. The first driving part is configured to drive the image sensor to move in a first direction perpendicular to the optical axis, and the first driving part includes at least one first coil and at least one first magnet. The at least one first magnet is disposed corresponding to the at least one first coil. The second driving part is configured to drive the image sensor to move in a second direction perpendicular to the optical axis, and the second driving part includes at least one second coil and at least one second magnet. The second direction is different from the first direction, and the at least one second magnet is disposed corresponding to the at least one second coil. The third driving part is configured to drive the image sensor to move in a direction parallel to the optical axis, and the third driving part includes at least one third coil and at least one third magnet. The at least one third magnet is disposed corresponding to the at least one third coil in the direction parallel to the optical axis. The base and the optical component correspond and are fixedly installed to each other. In addition, the first driving part and the second driving part are configured to cooperate to drive the image sensor to rotate around the optical axis, and a most image-side surface of the optical component has an intersection point with the optical axis. When a distance in parallel with the optical axis between a central point of the at least one first magnet and the intersection point is h1, a distance in parallel with the optical axis between a central point of the at least one second magnet and the intersection point is h2, and a distance in parallel with the optical axis between a central point of the at least one third magnet and the intersection point is h3, the following condition is preferably satisfied: $0 \leq h1 = h2 < h3$.

According to another aspect of the present disclosure, an imaging lens module includes an optical component, an image sensor, a first driving part, a second driving part, a third driving part, a movable plate and a base. The optical component has an optical axis. The image sensor is disposed corresponding to the optical component along the optical axis. The first driving part is configured to drive the image sensor to move in a first direction perpendicular to the optical axis, and the first driving part includes at least one first coil and at least one first magnet. The at least one first magnet is disposed corresponding to the at least one first coil. The second driving part is configured to drive the image sensor to move in a second direction perpendicular to the optical axis, and the second driving part includes at least one second coil and at least one second magnet. The second direction is different from the first direction, and the at least one second magnet is disposed corresponding to the at least one second coil. The third driving part is configured to drive the image sensor to move in a direction parallel to the optical axis, and the third driving part includes at least one third coil and at least one third magnet. The at least one third magnet is disposed corresponding to the at least one third coil in the direction parallel to the optical axis. Preferably, the at least one first magnet, the at least one second magnet and the at least one third magnet are disposed on the movable plate, and the third driving part is configured to drive the movable plate to move in the direction parallel to the optical axis. The base and the optical component correspond and are fixedly installed to each other. Preferably, the at least one third coil is disposed on the base. In addition, the first driving part and the second driving part are configured to cooperate to drive the image sensor to rotate around the optical axis, and a most image-side surface of the optical component has an intersection point with the optical axis. When a distance in parallel with the optical axis between a central point of the at least one third magnet and the intersection point is h3, and a back focal length of the optical component is BFL, the following condition is preferably satisfied: $BFL < h3$.

According to another aspect of the present disclosure, an electronic device includes one of the aforementioned imaging lens modules.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
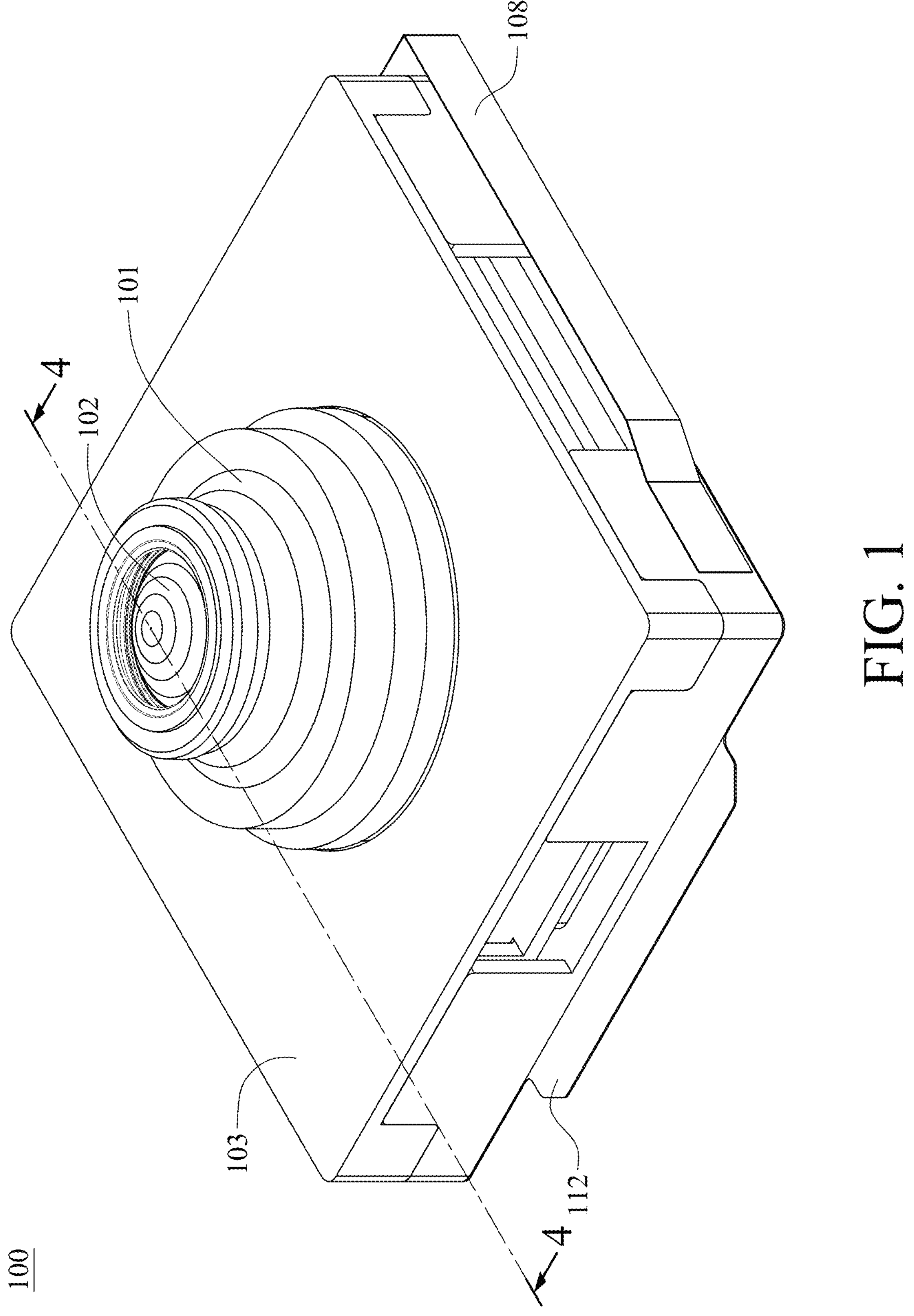
FIG. 1 is a perspective view of an imaging lens module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an imaging lens module. The imaging lens module includes an optical component, an image sensor, a first driving part, a second driving part, a third driving part and a base.

The optical component has an optical axis, and the image sensor is disposed corresponding to the optical component along the optical axis. In addition, the image sensor is movable relative to the optical component by driving components.

The first driving part is configured to drive the image sensor to move in a first direction perpendicular to the optical axis. The first driving part includes at least one first coil and at least one first magnet, and the first magnet is disposed corresponding to the first coil.

The second driving part is configured to drive the image sensor to move in a second direction perpendicular to the optical axis, where the second direction is different from the first direction. The second driving part includes at least one second coil and at least one second magnet, and the second magnet is disposed corresponding to the second coil. In the present disclosure, the first driving part and the second driving part are configured to drive the image sensor to move perpendicularly to the optical axis so as to provide optical image stabilization (OIS) functionality. Furthermore, the first driving part and the second driving part are also configured to cooperate to drive the image sensor to rotate around the optical axis. Specifically, if the direction of the optical axis is defined as a Z-axis, then the image sensor is movable in any direction on an XY plane defined by an X-axis and a Y-axis, which are perpendicular to the optical axis, and is also rotatable on the XY plane. Moreover, the coil and magnet of at least one of the first driving part and the second driving part (i.e., the first coil and the first magnet and/or the second coil and the second magnet) each can have a quantity of at least two. Therefore, when the number of coils and magnets of the first driving part and the second driving part increases, it is favorable for improving the accuracy of the rotation angle of the image sensor on the plane perpendicular to the optical axis.

The third driving part is configured to drive the image sensor to move in a direction parallel to the optical axis, and the third driving part includes at least one third coil and at least one third magnet. The third magnet is disposed corresponding to the third coil in the direction parallel to the optical axis. In the present disclosure, the third driving part is configured to drive the image sensor to move parallel to the optical axis so as to provide autofocus (AF) functionality. Specifically, if the direction of the optical axis is defined as a Z-axis, then the image sensor is movable along a direction parallel to the Z-axis. In addition, the number of the third coil and the number of the third magnet of the third driving part can each be at least two, and both the third coil and the third magnet are arranged in pairs. Therefore, the collimation of the movement of the image sensor in the direction parallel to the optical axis can be improved. Moreover, the third driving part can be located farther away from the optical component than both the first driving part and the second driving part.

The base and the optical component correspond and are fixedly installed to each other. Said fixed installation of the base and the optical component can refer to the optical component being directly or indirectly fixedly installed on the base, maintaining a fixed distance between the optical component and the base. Moreover, the third coil can be disposed on the base.

According to the present disclosure, by fixing the optical component relative to the base to maintain a fixed distance therebetween, with a movable image sensor, the stability of images captured by the imaging lens module can be enhanced, allowing for auto-focusing of the imaging lens module. Moreover, by the collaboration of multiple driving parts as described above, the movement of the image sensor can be controlled more accurately, allowing the image sensor to move and rotate in directions both parallel and perpendicular to the optical axis relative to the optical component, further fulfilling the requirements for anti-shake.

In one exemplary configuration, the imaging lens module can further include a movable plate. The first magnet, the second magnet and the third magnet can be disposed on the movable plate, and the third driving part can be configured to drive the movable plate to move in the direction parallel to the optical axis. The present disclosure is not limited to the arrangement of the third magnet and the third coil as described above. For example, in another exemplary configuration, a third magnet can be disposed on a base, and a third coil can be disposed on a movable plate.

A most image-side surface of the optical component has an intersection point with the optical axis. When a distance in parallel with the optical axis between a central point of the first magnet and the intersection point is h1, a distance in parallel with the optical axis between a central point of the second magnet and the intersection point is h2, and a distance in parallel with the optical axis between a central point of the third magnet and the intersection point is h3, the following condition can be satisfied: $0 \leq h1 = h2 < h3$. Please refer to FIG. 4, which shows a schematic view of h1, h2 and h3 according to the 1st embodiment of the present disclosure, where a most image-side surface of an optical component 102 has an intersection point P0 with an optical axis OL, a distance in parallel with the optical axis OL between a central point M1 of a first magnet 109*b* and the intersection point P0 is h1, a distance in parallel with the optical axis OL between a central point M2 of a second magnet 110*b* and the intersection point P0 is h2, and a distance in parallel with the optical axis OL between a central point M3 of a third magnet 111*b* and the intersection point P0 is h3. Said most image-side surface of the optical component refers to a surface of the optical component that is nearest to the image sensor. Additionally, it should be noted that the optical axis generally referred to can be a simplification of multiple optical axes of the optical component (e.g., a main optical axis and secondary optical axes). Therefore, the present disclosure is not limited to the position of the optical axis and the intersection point shown in the figures. In the present disclosure, the intersection point between the most image-side surface of the optical component and the optical axis refers to the intersection between the most image-side surface and the main optical axis of the optical component, where the main optical axis can, for example, pass through an optical center of the optical component, or there can be a slight offset between the main optical axis and the optical center. When there is a slight offset between the main optical axis and the optical center, the intersection point, for example, may be located near the optical center of the optical component.

When the distance in parallel with the optical axis between the central point of the third magnet and the intersection point is h3, and a back focal length of the optical component is BFL, the following condition can be satisfied: $BFL < h3$. The back focal length of the optical component refers to a distance in parallel with the optical axis from the intersection point to the image sensor. Moreover, the optical component, the image sensor and the third magnet can be arranged in sequence from an object side to an image side in the direction parallel to the optical axis. Please refer to FIG. 4, which shows a schematic view of BFL and h3 according to the 1st embodiment of the present disclosure, where the most image-side surface of the optical component 102 has the intersection point P0 with the optical axis OL, and a distance in parallel with the optical axis OL from intersection point P0 to an image sensor 104 is the back focal length BFL of the optical component 102.

The imaging lens module can further include a frame component. The frame component holds the image sensor, and the movable plate is disposed corresponding to the frame component. Furthermore, the frame component and the movable plate can be arranged in sequence from the object side to the image side in the direction parallel to the optical axis. In one exemplary configuration, a movable plate can be disposed corresponding to a frame component and a base, where the movable plate can be disposed between the frame component and the base, and the frame component, the movable plate and the base can be arranged in sequence from the object side to the image side in the direction parallel to the optical axis. Moreover, a first coil and a second coil can be disposed on the frame component. However, the present disclosure is not limited to the arrangement of the first magnet, the second magnet, the first coil and the second coil as described above. For example, in another exemplary configuration, a first magnet and a second magnet can be disposed on a frame component, and the first coil and the second coil can be disposed on a movable plate.

The movable plate can have at least one first side wall, and the first side wall can include at least one first recess. The base can have at least one second side wall, and the second side wall can include at least one second recess. In addition, the first recess is disposed corresponding to the second recess, and the first recess and the second recess together form a track parallel to the optical axis. Therefore, the movable plate is movable along the track in the direction parallel to the optical axis. Moreover, moving along a fixed path can ensure that the movement of the movable plate in the direction parallel to the optical axis is less likely to deviate. Each of the first recess and the second recess can have a quantity of at least two, thus allowing for the formation of at least two sets of tracks. Therefore, it is favorable for improving the balance of movement, such that the movable plate is less likely to tilt.

The third driving part can further include at least one autofocus rolling member disposed between the movable plate and the base, allowing the movable plate to move relative to the base, where the autofocus rolling member is movably disposed in the track in the direction parallel to the optical axis, and the third driving part is configured to drive the movable plate to move relative to the optical component in the direction parallel to the optical axis. Therefore, it is favorable for more stable movement of the movable plate in the direction parallel to the optical axis. Moreover, the autofocus rolling member can be a ball component, but the present disclosure is not limited thereto.

The first driving part and the second driving part can further include at least one image stabilization rolling member disposed between the frame component and the movable plate, allowing the frame component to move relative to the movable plate, where the first driving part and the second driving part are configured to drive the frame component and the image sensor to translate and rotate relative to the optical component in directions perpendicular to the optical axis. Therefore, it is favorable for more stable movement of the frame component and the image sensor in the direction perpendicular to the optical axis. Moreover, the image stabilization rolling member can be a ball component, but the present disclosure is not limited thereto.

The frame component can include at least one third recess, and the movable plate can include at least one flat support structure, where the third recess is disposed corresponding to the flat support structure, the image stabilization rolling member is disposed between the third recess and the flat support structure, and the image stabilization rolling member is configured to translate and rotate on the flat support structure in directions perpendicular to the optical axis. Moreover, the flat support structure can have no fixed track path, and the image stabilization rolling member can translate and rotate on the flat support structure in directions perpendicular to the optical axis, such that the image stabilization rolling member has at least three axes of freedom in directions perpendicular to the optical axis.

The imaging lens module can further include a barrel and a casing. The barrel accommodates the optical component. The casing is mechanically mounted to the barrel, and the casing is assembled to the base. In addition, the casing can be mechanically mounted to the base through various methods such as screw locking, interlocking and active alignment (AA), and can be secured in place with adhesive dispensing after positioning, but the present disclosure is not limited to the mechanical mounting methods. It is necessary to consider whether the mechanical mounting method between the casing and the barrel will affect the imaging quality of the optical component. Additionally, the method of assembling the casing onto the base can involve mechanical fitting in assembly. Moreover, the configuration of the casing assembled on the base can prevent dust from entering components such as the optical component and the image sensor, but the present disclosure is not limited thereto.

The barrel and the casing can be formed of a single piece. Therefore, it is favorable for simplifying the assembly process, thereby improving production efficiency.

The imaging lens module can further include a flexible circuit board. The flexible circuit board is electrically connected to the image sensor, where the flexible circuit board includes at least one bend portion, and the bend portion is a bent part on the flexible circuit board that forms an angle. Moreover, the flexible circuit board is configured to accommodate the movement of the image sensor during autofocus or optical image stabilization, so a part of the flexible circuit board featuring an angled bend prevents mechanical interference during movement. The part of the flexible circuit board featuring an angled bend is referred to as the bend portion. Moreover, due to the angled bending, the bend portion forms a crease, and thus the flexible circuit board has a distinctive shape. Please refer to FIG. 2 and FIG. 3, which show a schematic view of a flexible circuit board 108 and bend portions 108*a* according to the 1st embodiment of the present disclosure.

According to the present disclosure, an electronic device is provided. The electronic device includes the aforementioned imaging lens module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
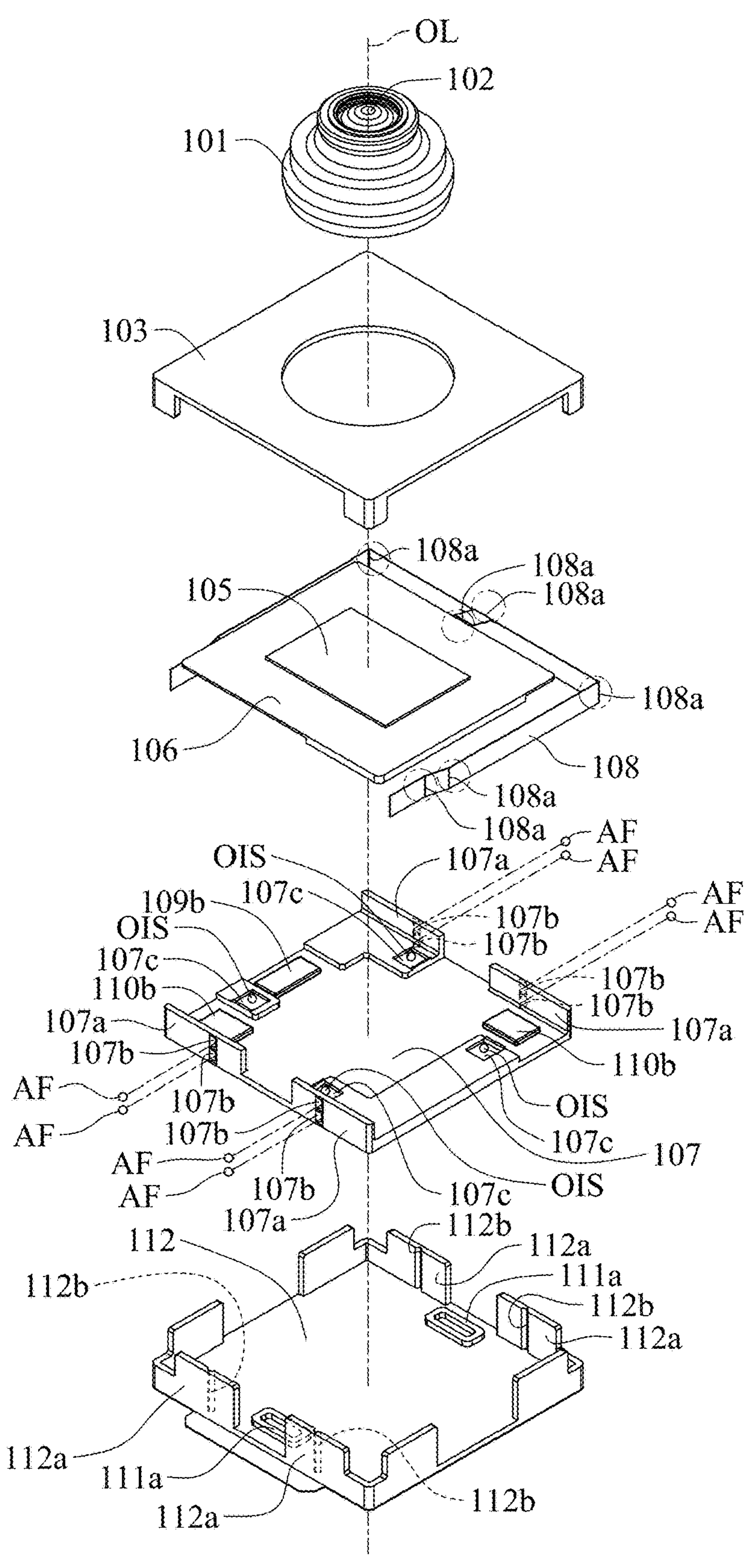
FIG. 2 is an exploded view of the imaging lens module in FIG. 1.
Figure 3:
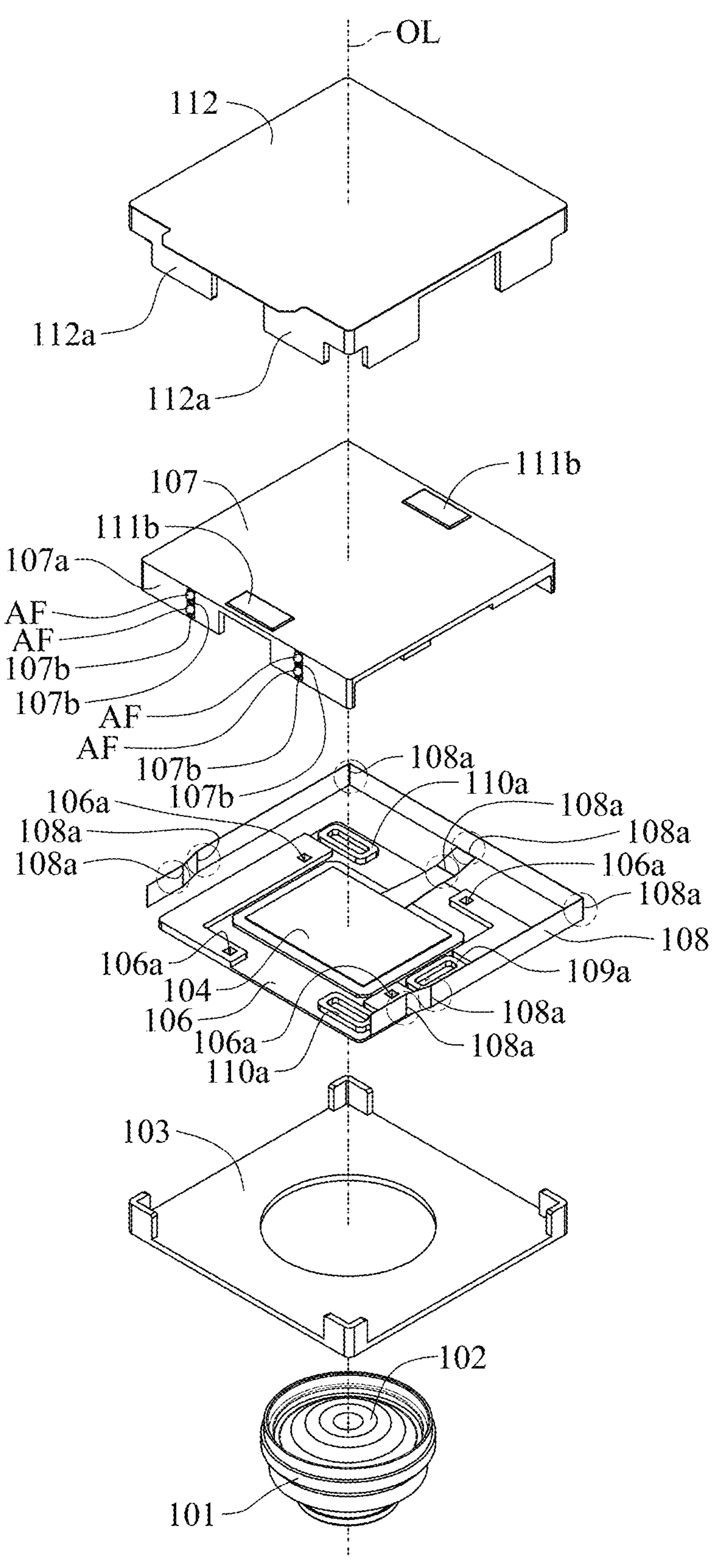
FIG. 3 is another exploded view of the imaging lens module in FIG. 1.
Figure 4:
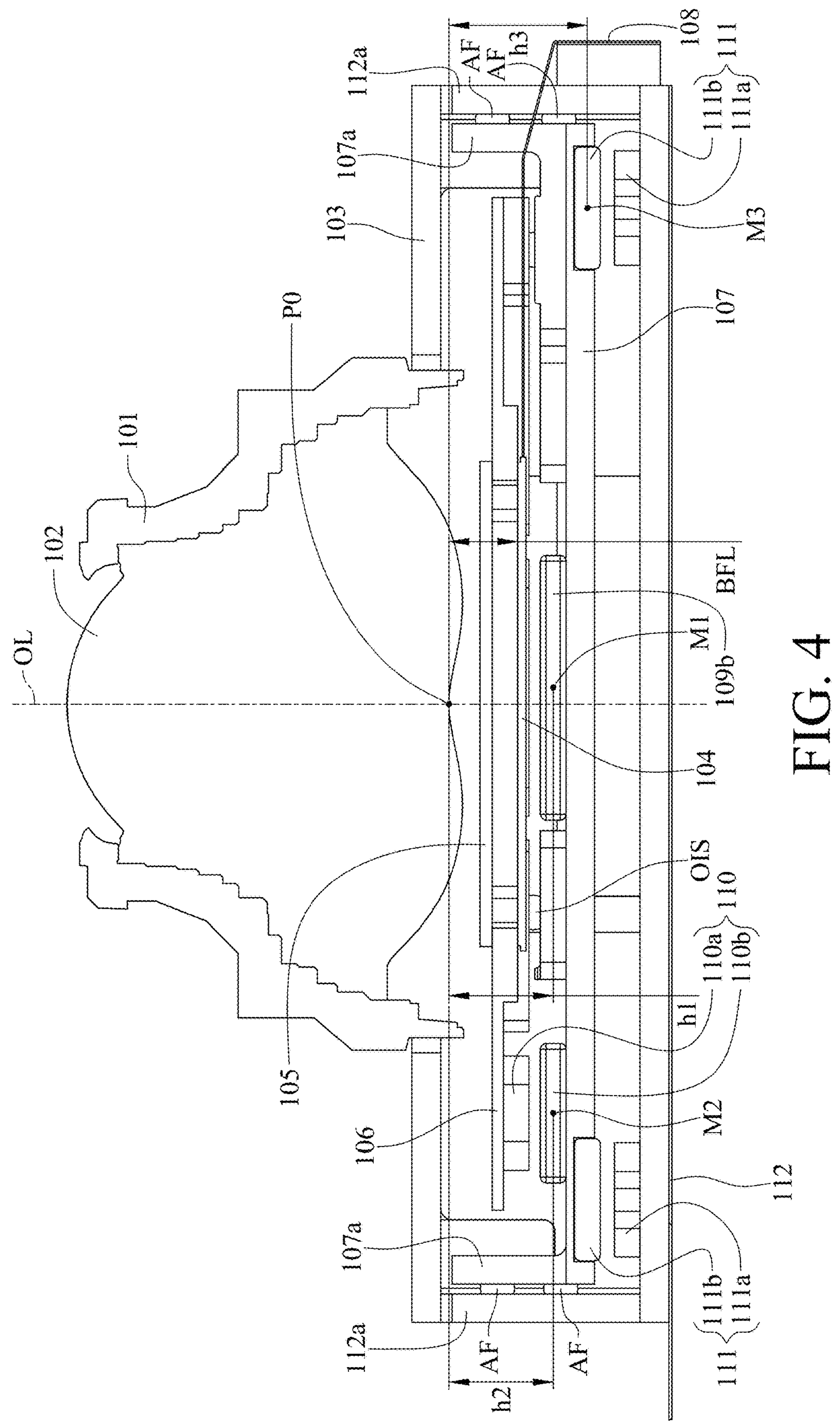
FIG. 4 is a cross-sectional view of the imaging lens module taken along line 4-4 in FIG. 1.
Figure 5:
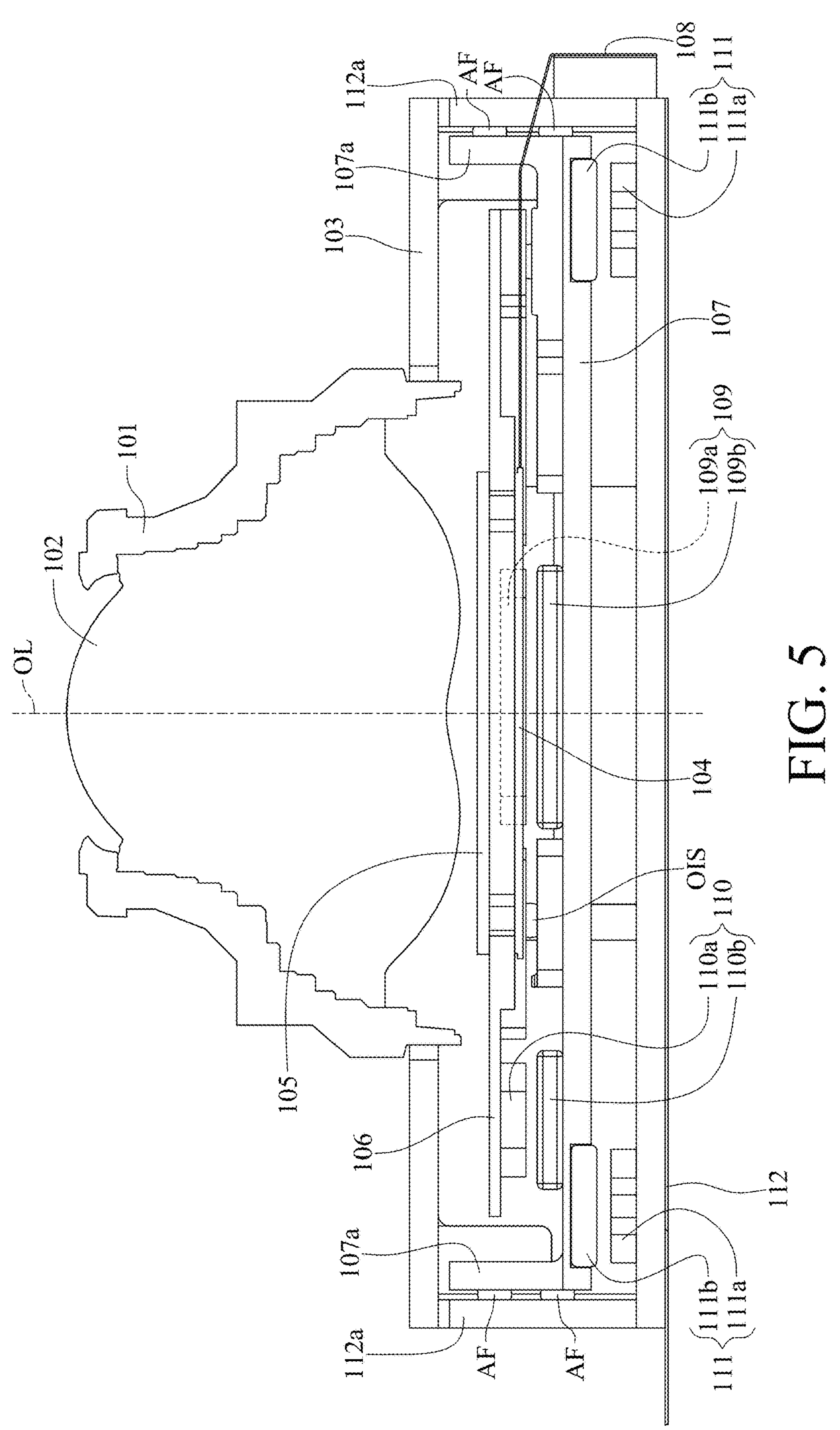
FIG. 5 is another cross-sectional view of the imaging lens module taken along line 4-4 in FIG. 1.
Figure 6:
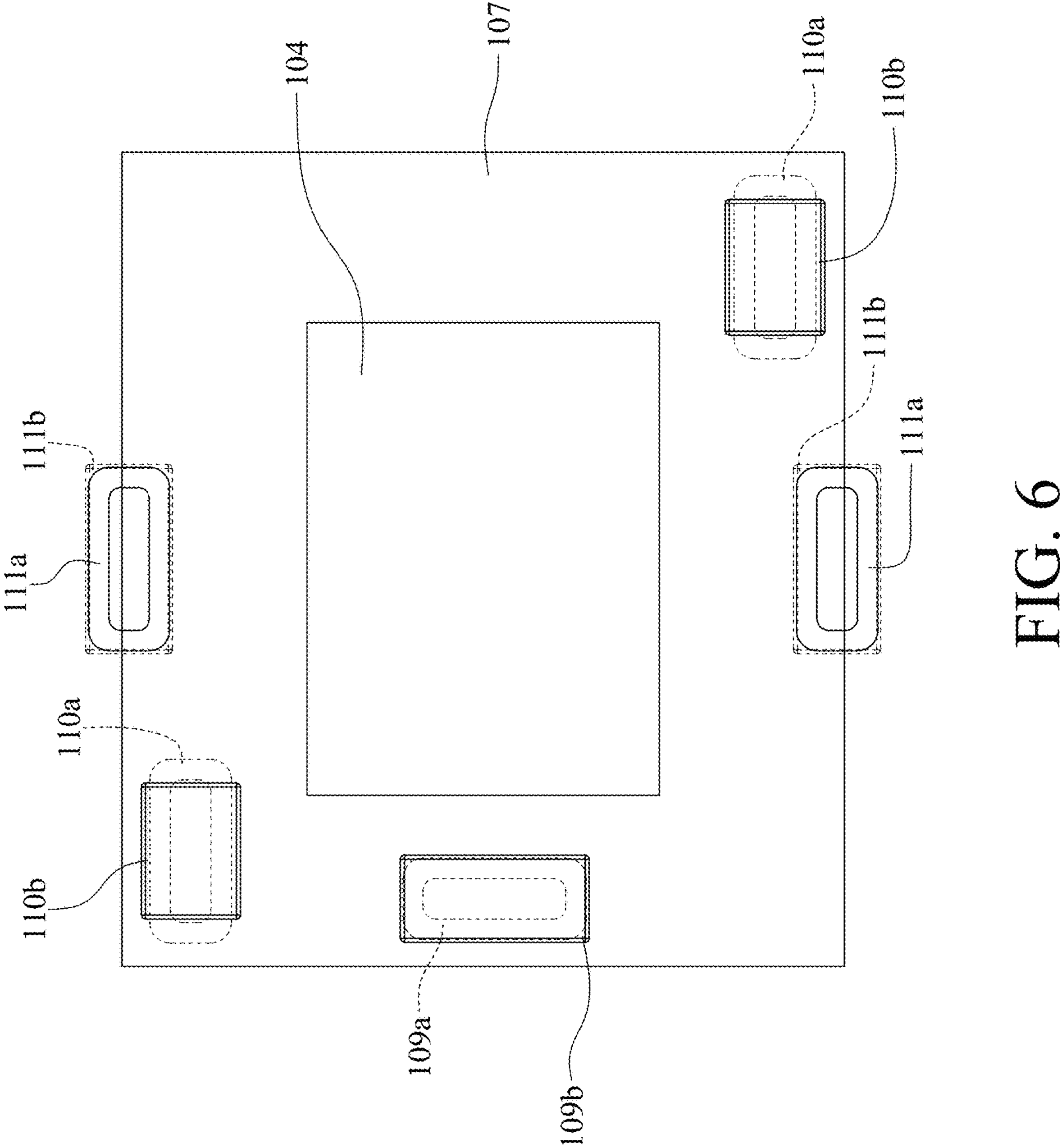
FIG. 6 is a schematic view of an arrangement of coils, magnets and an image sensor in FIG. 1.

FIG. 1 is a perspective view of an imaging lens module according to the 1st embodiment of the present disclosure, FIG. 2 is an exploded view of the imaging lens module in FIG. 1, FIG. 3 is another exploded view of the imaging lens module in FIG. 1, FIG. 4 is a cross-sectional view of the imaging lens module taken along line 4-4 in FIG. 1, FIG. 5 is another cross-sectional view of the imaging lens module taken along line 4-4 in FIG. 1, and FIG. 6 is a schematic view of an arrangement of coils, magnets and an image sensor in FIG. 1.

An imaging lens module 100 includes a barrel 101, an optical component 102, a casing 103, an image sensor 104, a filter 105, a frame component 106, a movable plate 107, a flexible circuit board 108, a first driving part 109, a second driving part 110, a third driving part 111 and a base 112.

The barrel 101 accommodates the optical component 102, the casing 103 is mechanically mounted to the barrel 101, and the casing 103 is assembled to the base 112.

The optical component 102 has an optical axis OL, and the base 112 and the optical component 102 correspond and are fixedly installed to each other, maintaining a fixed distance between the optical component 102 and the base 112.

The image sensor 104 is disposed corresponding to the optical component 102 along the optical axis OL, and the image sensor 104 is movable relative to the optical component 102.

The filter 105 is disposed on the frame component 106, and the frame component 106 holds the image sensor 104. Imaging light from the optical component 102 can pass through the filter 105 and form an image on the image sensor 104.

The movable plate 107 is disposed corresponding to the frame component 106 and the base 112. Specifically, the movable plate 107 is disposed between the frame component 106 and the base 112, and the frame component 106, the movable plate 107 and the base 112 is arranged in sequence from an object side to an image side in a direction parallel to the optical axis OL. In addition, the movable plate 107 has four first side walls 107*a*, and each of the four first side walls 107*a* includes two first recesses 107*b*. The base 112 has four second side walls 112*a*, and each of the four second side walls 112*a* includes a second recess 112*b*. Moreover, the two first recesses 107*b* on the same first side wall 107*a* are disposed corresponding to the second recess 112*b* on the corresponding second side wall 112*a*, and the corresponding first recesses 107*b* and second recess 112*b* together form a track parallel to the optical axis OL. Furthermore, the movable plate 107 is movable along the track in the direction parallel to the optical axis OL.

The frame component 106 includes a plurality of third recesses 106*a*, the movable plate 107 includes a plurality of flat support structures 107*c*, and the third recesses 106*a* are disposed corresponding to the flat support structures 107*c*, respectively.

The flexible circuit board 108 is electrically connected to the image sensor 104, the flexible circuit board 108 includes a plurality of bend portions 108*a*, and each of the bend portions 108*a* is a bent part on the flexible circuit board 108 that forms an angle.

The first driving part 109 is configured to drive the image sensor 104 to move in a first direction perpendicular to the optical axis OL, and the first driving part 109 includes a first coil 109*a* and a first magnet 109*b*, where the first magnet 109*b* is disposed corresponding to the first coil 109*a*.

The second driving part 110 is configured to drive the image sensor 104 to move in a second direction perpendicular to the optical axis OL, where the second direction is different from the first direction. The second driving part 110 includes two second coils 110*a* and two second magnets 110*b*. The second magnets 110*b* are disposed corresponding to the second coils 110*a*, respectively. In addition, the first driving part 109 and the second driving part 110 are further configured to cooperate to drive the image sensor 104 to rotate around the optical axis OL.

The first driving part 109 and the second driving part 110 further include a plurality of image stabilization rolling members OIS disposed between the frame component 106 and the movable plate 107, allowing the frame component 106 to move relative to the movable plate 107, where the first driving part 109 and the second driving part 110 are configured to drive the frame component 106 and the image sensor 104 to translate and rotate relative to the optical component 102 in directions perpendicular to the optical axis OL. Specifically, the image stabilization rolling members OIS are respectively disposed between the third recesses 106*a* and the flat support structures 107*c*, and the image stabilization rolling members OIS are configured to translate and rotate on the flat support structures 107*c* in directions perpendicular to the optical axis OL. Moreover, the flat support structures 107*c* have no fixed track path, and the image stabilization rolling members OIS can translate and rotate on the flat support structures 107*c* in directions perpendicular to the optical axis OL, such that the image stabilization rolling members OIS each has at least three axes of freedom in directions perpendicular to the optical axis OL. In this embodiment, the image stabilization rolling members OIS are ball components.

The third driving part 111 is configured to drive the image sensor 104 to move in the direction parallel to the optical axis OL, and the third driving part 111 includes two third coils 111*a* and two third magnets 111*b*. The third coils 111*a* are disposed on the base 112, and the third magnets 111*b* are respectively disposed corresponding to the third coils 111*a* in the direction parallel to the optical axis OL. Moreover, the third driving part 111 is located farther away from the optical component 102 than both the first driving part 109 and the second driving part 110. The first magnet 109*b*, the second magnets 110*b* and the third magnets 111*b* are disposed on the movable plate 107, and the third driving part 111 is configured to drive the movable plate 107 to move in the direction parallel to the optical axis OL. In this embodiment, the first coil 109*a* and the second coils 110*a* are disposed on the frame component 106, the third coils 111*a* are disposed on the base 112, and the optical component 102, the image sensor 104 and the third magnets 111*b* are arranged in sequence from the object side to the image side in the direction parallel to the optical axis OL.

In this embodiment, the third driving part 111 further includes a plurality of autofocus rolling members AF disposed between the movable plate 107 and the base 112, allowing the movable plate 107 to move relative to the base 112, where the autofocus rolling members AF are movably disposed in the tracks in the direction parallel to the optical axis OL, respectively, and the third driving part 111 is configured to drive the movable plate 107 to move relative to the optical component 102 in the direction parallel to the optical axis OL. Specifically, the autofocus rolling members AF are respectively disposed in the first recesses 107*b*. In this embodiment, the autofocus rolling members AF are ball components.

A most image-side surface of the optical component 102 has an intersection point P0 with the optical axis OL. When a distance in parallel with the optical axis OL between a central point M1 of the first magnet 109*b* and the intersection point P0 is h1, a distance in parallel with the optical axis OL between a central point M2 of each of the second magnets 110*b* and the intersection point P0 is h2, and a distance in parallel with the optical axis OL between a central point M3 of each of the third magnets 111*b* and the intersection point P0 is h3, the following condition is satisfied: $0 \leq h1 = h2 < h3$. In this embodiment, h1=1.83 millimeters (mm), h2=1.83 mm, and h3=2.43 mm.

When a back focal length of the optical component 102 is BFL, and the distance in parallel with the optical axis OL between the central point M3 of each of the third magnets 111*b* and the intersection point P0 is h3, the following condition is satisfied: $BFL < h3$. In this embodiment, BFL=1.205 mm, and h3=2.43 mm.

Figure 7:
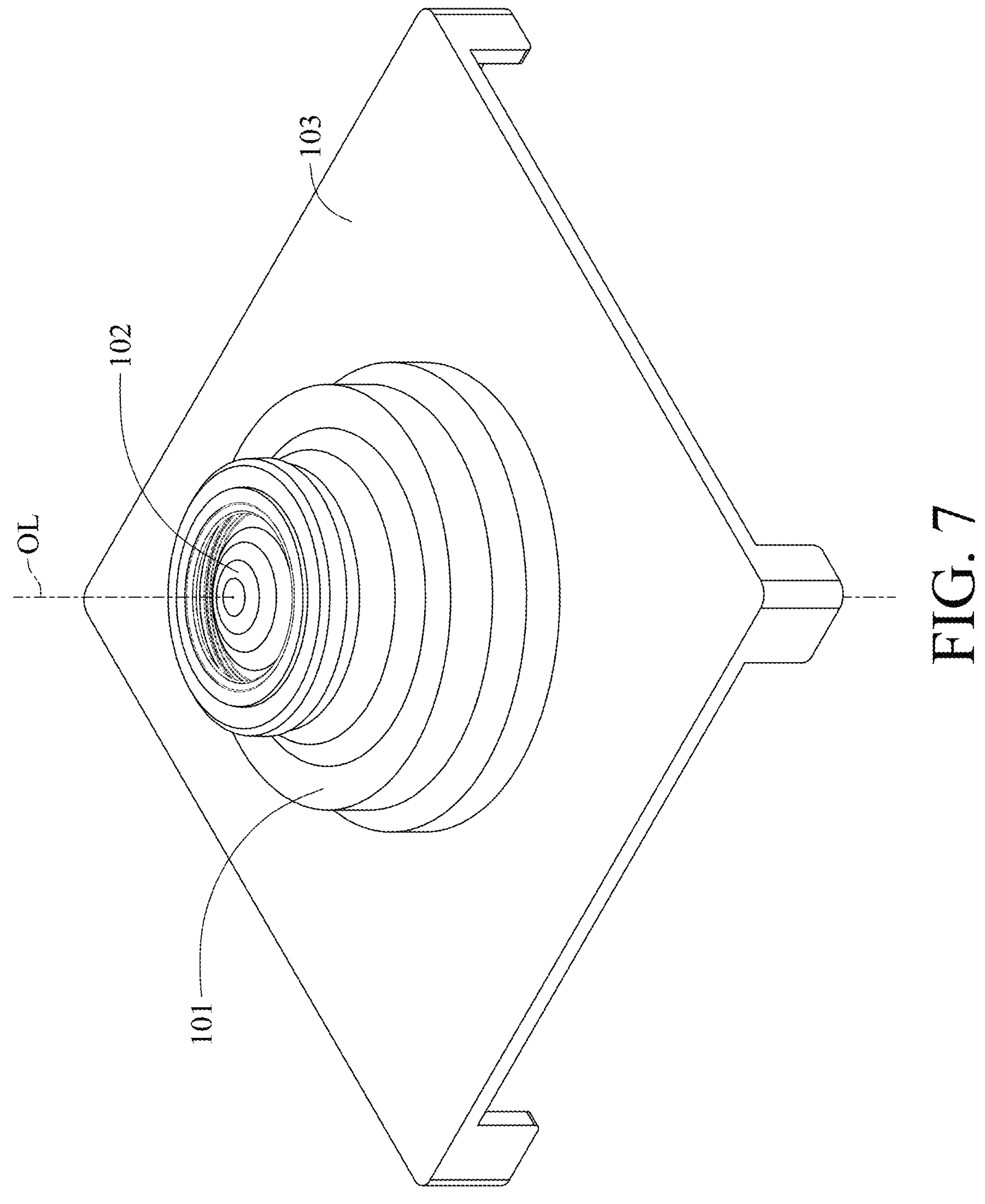
FIG. 7 is a perspective view of a barrel, an optical component and a casing according to another exemplary configuration of the present disclosure.
Figure 8:
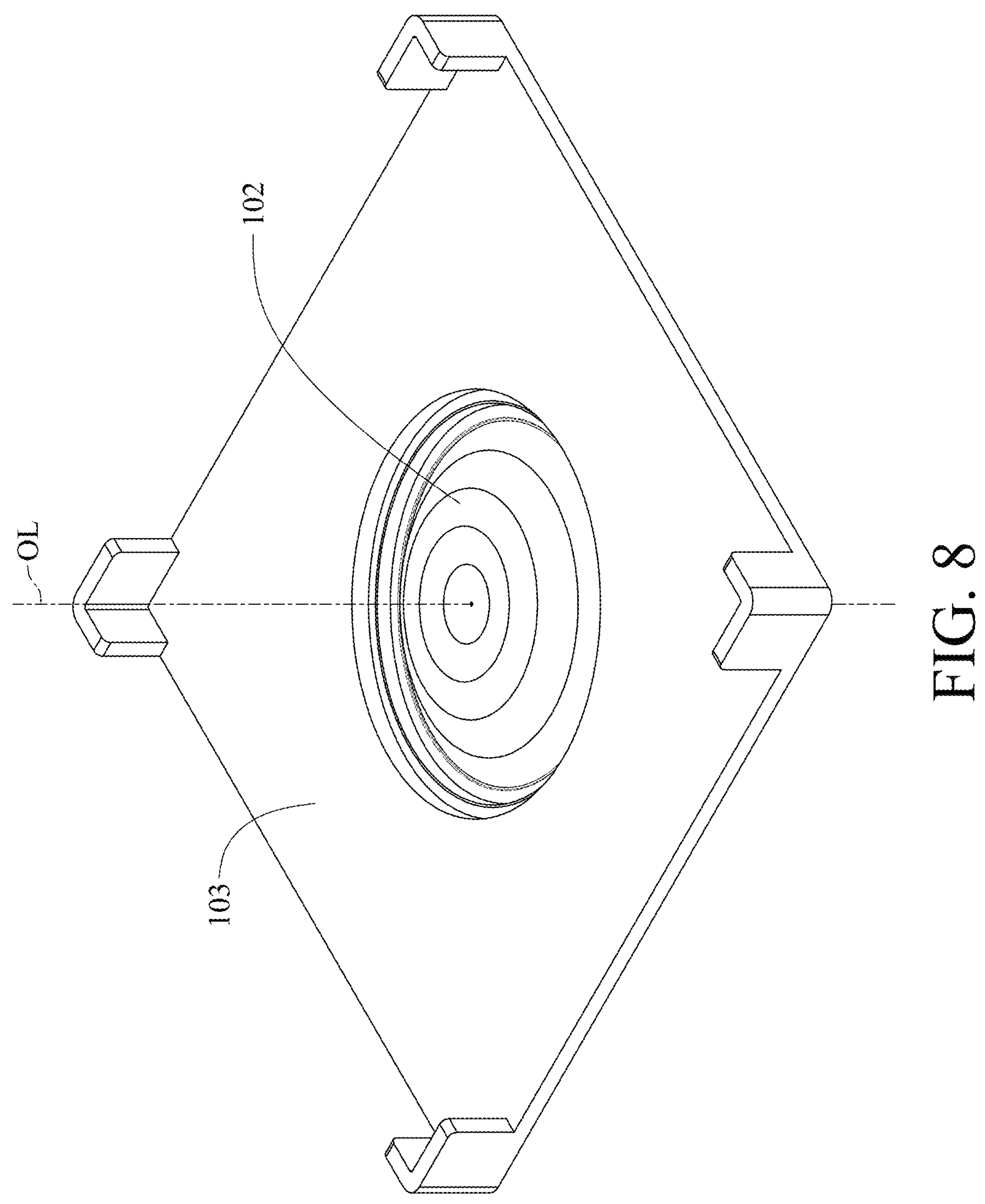
FIG. 8 is another perspective view of the barrel, the optical component and the casing in FIG. 7.

In the 1st embodiment, the barrel 101 and the casing 103 are separate components and not formed of a single piece, and the casing 103 is mechanically mounted to the barrel 101, but the present disclosure is not limited thereto. For example, referring to FIG. 7 and FIG. 8, FIG. 7 is a perspective view of a barrel 101, an optical component 102 and a casing 103 according to another exemplary configuration of the present disclosure, and FIG. 8 is another perspective view of the barrel 101, the optical component 102 and the casing 103 in FIG. 7. An imaging lens module in FIG. 7 and FIG. 8 is similar to the imaging lens module 100 in FIG. 1 through FIG. 6 as described above. The same reference numerals indicate the same components, and functions and effects provided by those components are the same as described above, so an explanation in this regard will not be provided again. As shown in FIG. 7 and FIG. 8, in another exemplary configuration, the barrel 101 and the casing 103 are formed of a single piece.

Figure 9:
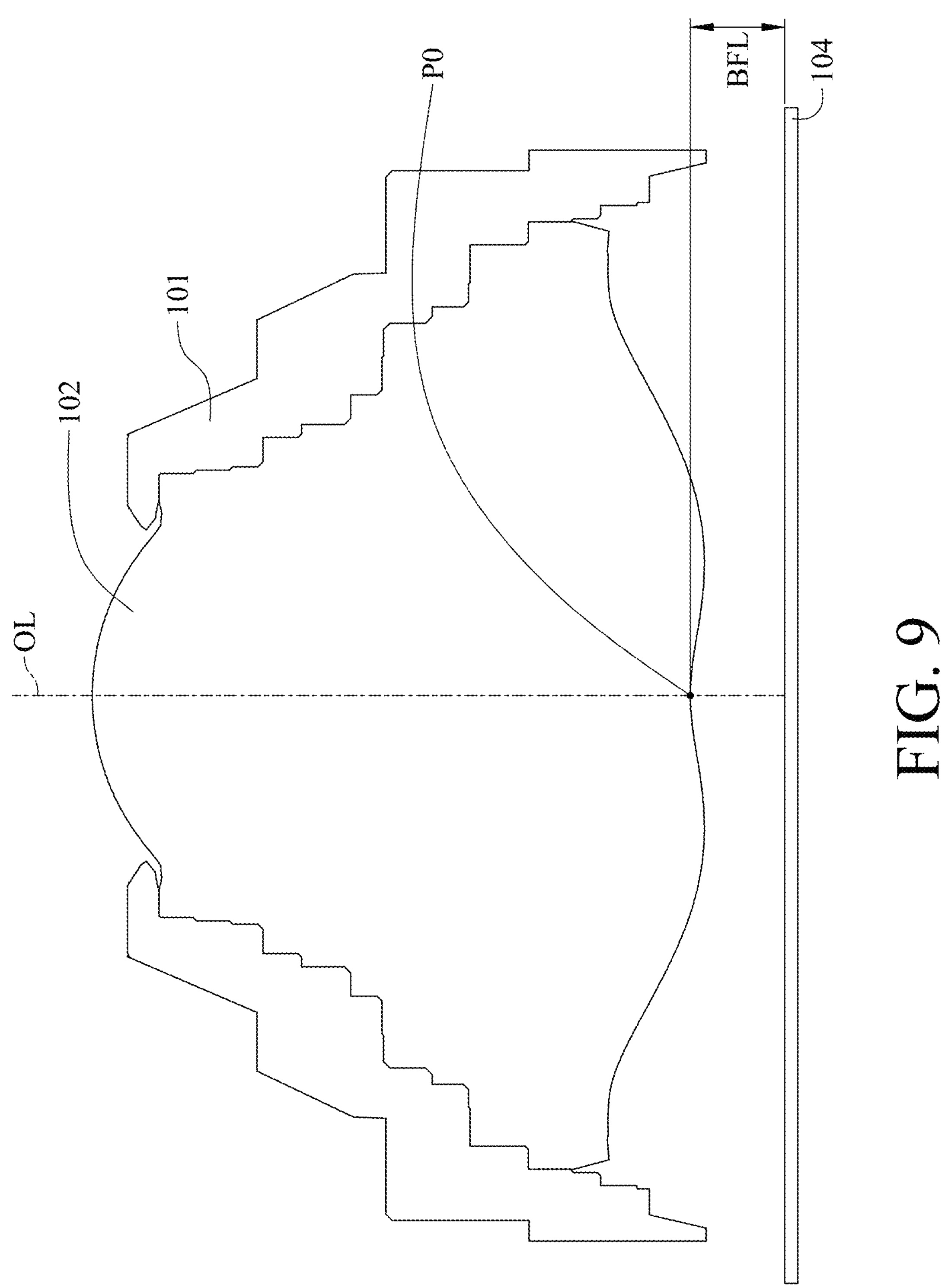
FIG. 9 is a cross-sectional view of an optical component, a barrel and an image sensor of an imaging lens module according to another exemplary configuration of the present disclosure.
Figure 10:
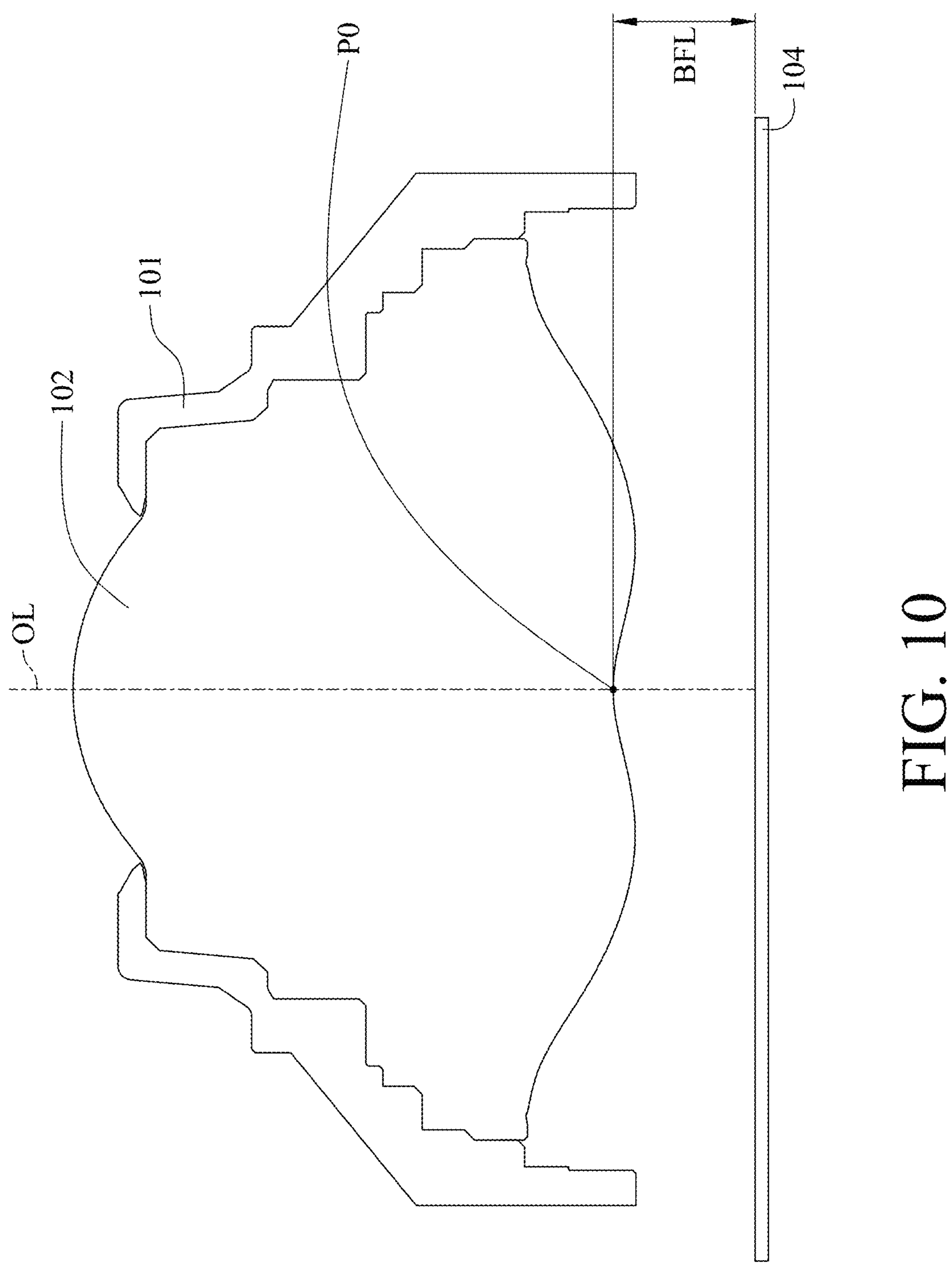
FIG. 10 is a cross-sectional view of an optical component, a barrel and an image sensor of an imaging lens module according to still another exemplary configuration of the present disclosure.
Figure 11:
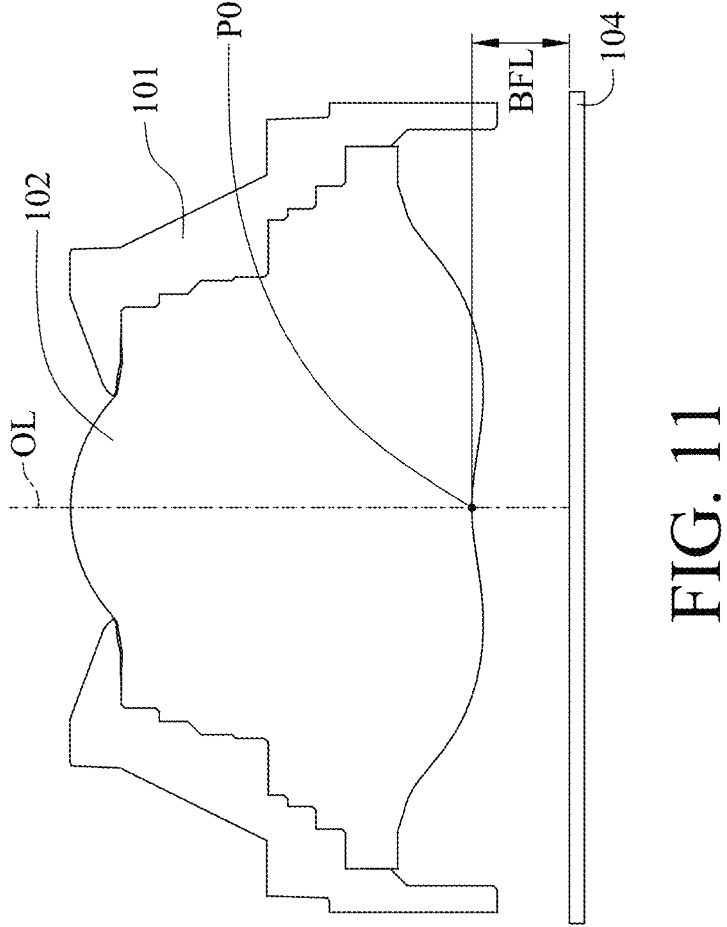
FIG. 11 is a cross-sectional view of an optical component, a barrel and an image sensor of an imaging lens module according to yet another exemplary configuration of the present disclosure.

The present disclosure is not limited to the back focal length as disclosed in the 1st embodiment. For example, referring to FIG. 9 to FIG. 11, FIG. 9 is a cross-sectional view of an optical component 102, a barrel 101 and an image sensor 104 of an imaging lens module according to another exemplary configuration of the present disclosure, FIG. 10 is a cross-sectional view of an optical component 102, a barrel 101 and an image sensor 104 of an imaging lens module according to still another exemplary configuration of the present disclosure, and FIG. 11 is a cross-sectional view of an optical component 102, a barrel 101 and an image sensor 104 of an imaging lens module according to yet another exemplary configuration of the present disclosure. Each of the imaging lens modules in FIG. 9 through FIG. 11 is similar to the imaging lens module 100 in FIG. 1 through FIG. 6 as described above. The same reference numerals indicate the same components, and functions and effects provided by those components are the same as described above, so an explanation in this regard will not be provided again. As shown in FIG. 9, in another exemplary configuration, a back focal length BFL of the optical component 102 is 1.442 mm. As shown in FIG. 10, in still another exemplary configuration, a back focal length BFL of the optical component 102 is 2.111 mm. As shown in FIG. 11, in yet another exemplary configuration, a back focal length BFL of the optical component 102 is 1.287 mm. In each of the exemplary configurations, the back focal length BFL of the optical component 102 is smaller than h3 (i.e., satisfying BFL<h3).

As shown in FIG. 6, in the 1st embodiment, there are one first magnet 109*b*, two second magnets 110*b* and two third magnets 111*b* disposed on the movable plate 107. From the perspective of FIG. 6, the first magnet 109*b* is located on the left side of the image sensor 104, the two second magnets 110*b* are respectively located on the upper left side and lower right side of the image sensor 104, the two the third magnets 111*b* are respectively located on the upper side and lower side of the image sensor 104. The first coil 109*a* is disposed corresponding to the first magnet 109*b*, the two second coils 110*a* are respectively disposed corresponding to the two second magnets 110*b*, and the two third coils 111*a* are respectively disposed corresponding to the two third magnets 111*b*.

The present disclosure is not limited to the relative positional relationships between the coils, magnets, and image sensor or the number of coils and magnets as described in the 1st embodiment. For example, referring to FIG. 12 to FIG. 17, which respectively show a schematic view of an arrangement of coils, magnets and an image sensor according to first through sixth exemplary configurations of the present disclosure. The coils, magnets and image sensor in FIG. 12 through FIG. 17 are similar to the coils, magnets and image sensor in FIG. 1 through FIG. 6 as described above. The same reference numerals indicate the same components, and functions and effects provided by those components are the same as described above, so an explanation in this regard will not be provided again. Moreover, the magnetic pole orientations (i.e., the N and S poles shown in the figures) of each magnet in FIG. 12 to FIG. 17 are only exemplary, and the present disclosure is not limited to the magnetic pole orientations shown in the figures.

Figure 12:
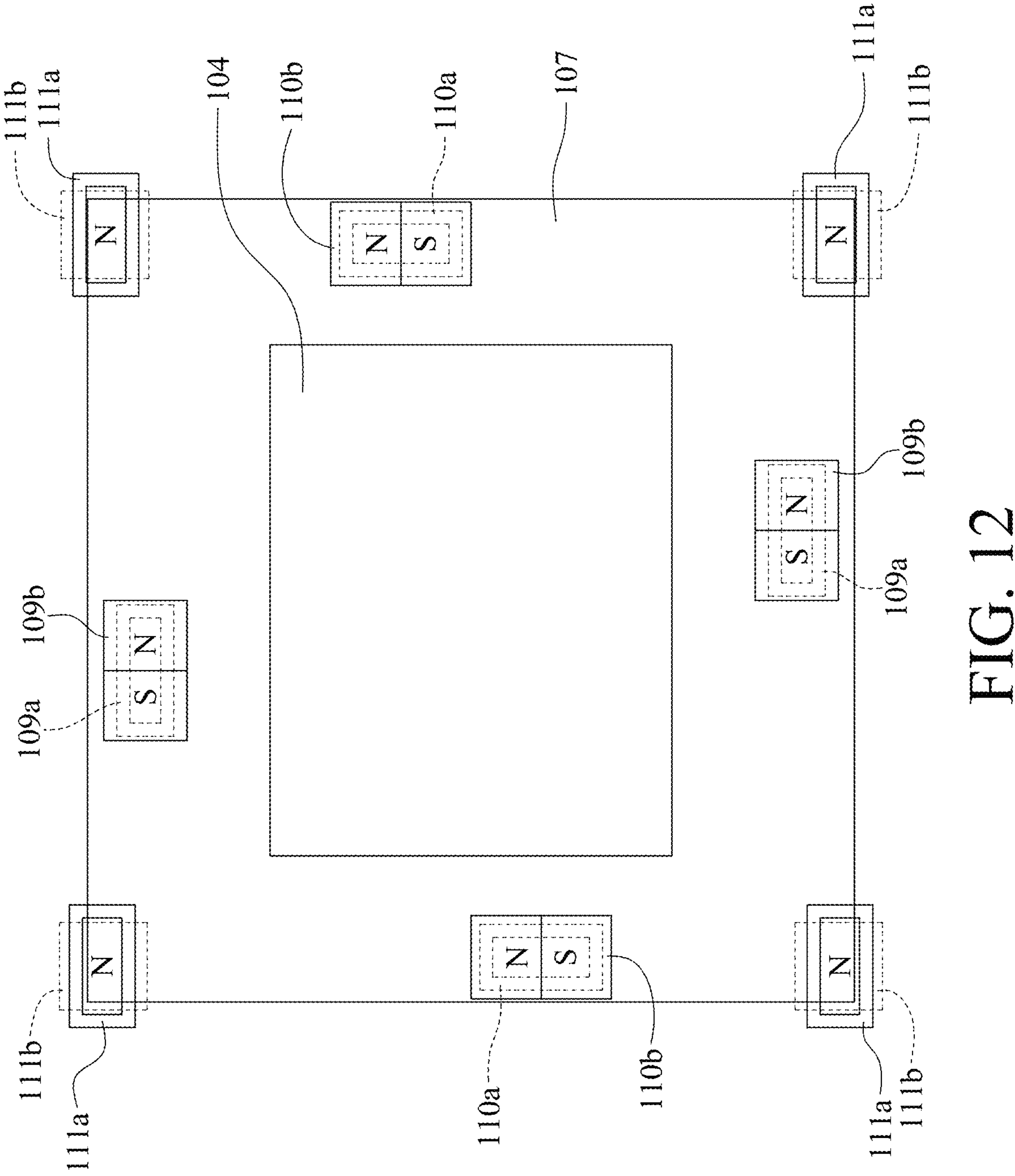
FIG. 12 is a schematic view of an arrangement of coils, magnets and an image sensor according to a first exemplary configuration of the present disclosure.

In the first exemplary configuration illustrated in FIG. 12, from the perspective of FIG. 12, two first magnets 109*b* are respectively disposed on the upper side and the lower side of an image sensor 104, two second magnets 110*b* are respectively disposed on the left side and the right side of the image sensor 104, and four third magnets 111*b* are respectively disposed on the upper left side, the lower left side, the upper right side and the lower right side of the image sensor 104. Two first coils 109*a* are respectively disposed corresponding to the two first magnets 109*b*, two second coils 110*a* are respectively disposed corresponding to the two second magnets 110*b*, and four third coils 111*a* are respectively disposed corresponding to the four third magnets 111*b*.

Figure 13:
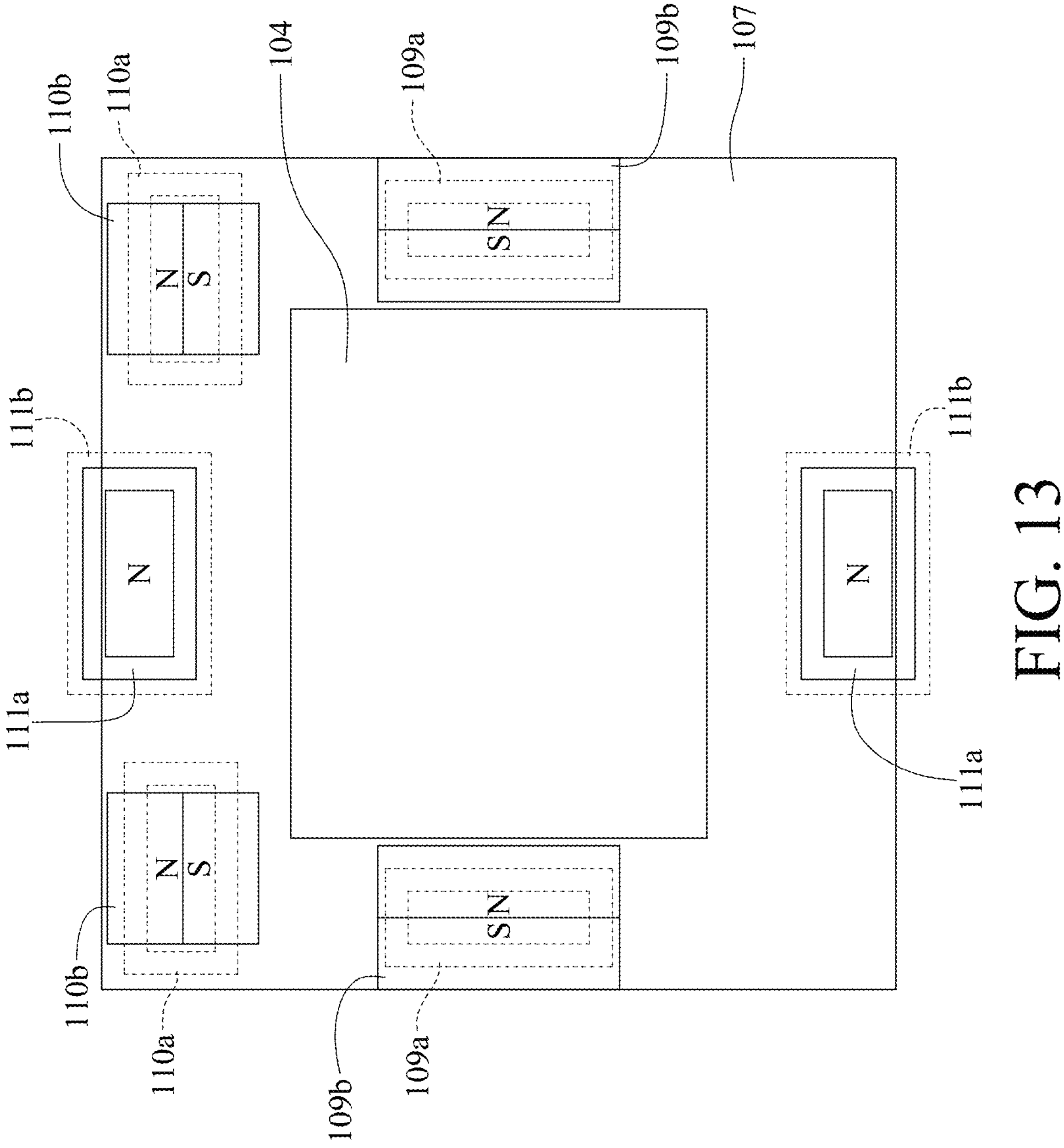
FIG. 13 is a schematic view of an arrangement of coils, magnets and an image sensor according to a second exemplary configuration of the present disclosure.

In the second exemplary configuration illustrated in FIG. 13, from the perspective of FIG. 13, two first magnets 109*b* are respectively disposed on the left side and the right side of the image sensor 104, two second magnets 110*b* are respectively disposed on the upper left side and the upper right side of the image sensor 104, and two third magnets 111*b* are respectively disposed on the upper side and the lower side of the image sensor 104. Two first coils 109*a* are respectively disposed corresponding to the two first magnets 109*b*, two second coils 110*a* are respectively disposed corresponding to the two second magnets 110*b*, and two third coils 111*a* are respectively disposed corresponding to the two third magnets 111*b*.

Figure 14:
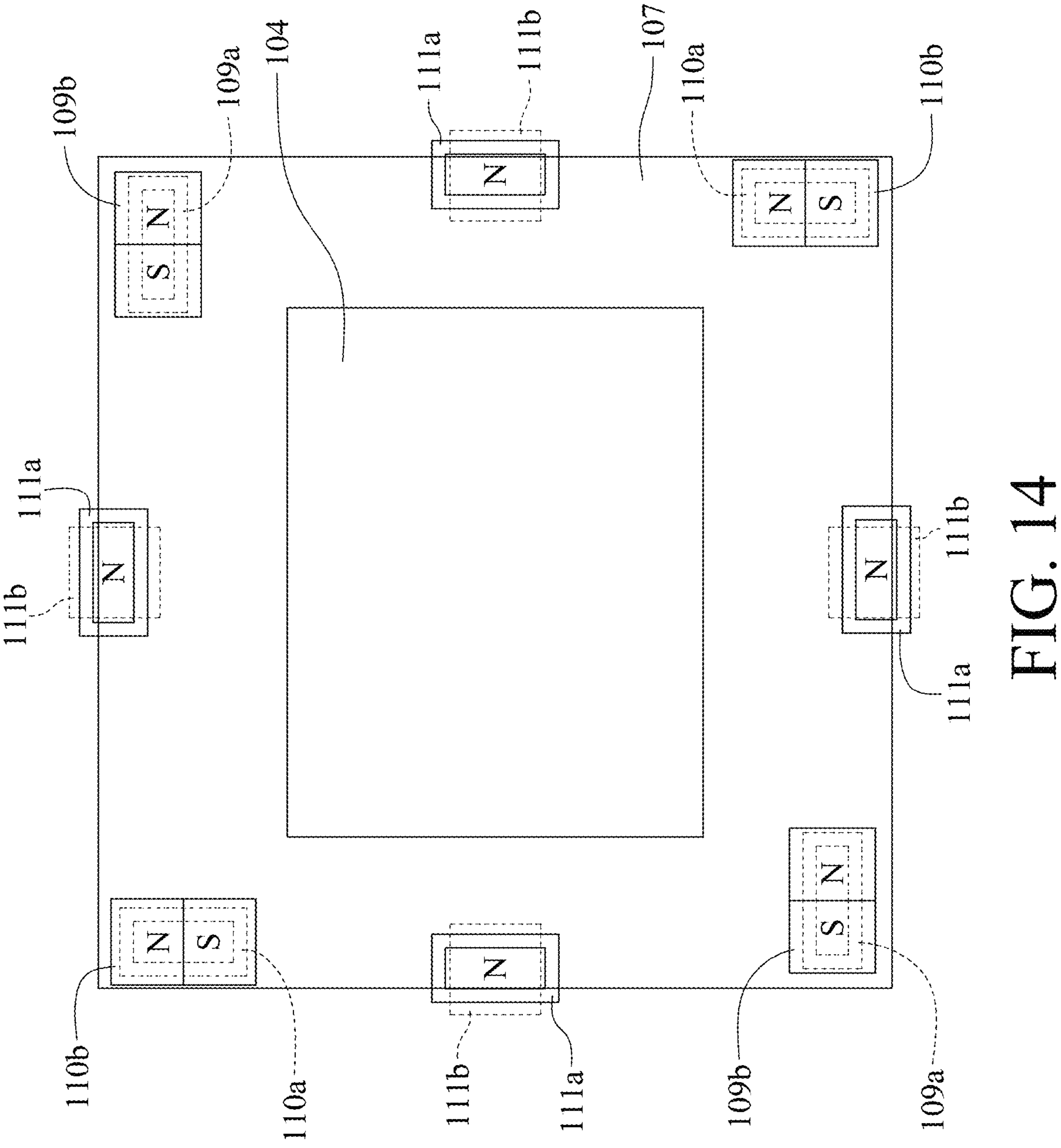
FIG. 14 is a schematic view of an arrangement of coils, magnets and an image sensor according to a third exemplary configuration of the present disclosure.

In the third exemplary configuration illustrated in FIG. 14, from the perspective of FIG. 14, two first magnets 109*b* are respectively disposed on the lower left side and the upper right side of the image sensor 104, two second magnets 110*b* are respectively disposed on the upper left side and the lower right side of the image sensor 104, and four third magnets 111*b* are respectively disposed on the upper side, the lower side, the left side and the right side of the image sensor 104. Two first coils 109*a* are respectively disposed corresponding to the two first magnets 109*b*, two second coils 110*a* are respectively disposed corresponding to the two second magnets 110*b*, and four third coils 111*a* are respectively disposed corresponding to the four third magnets 111*b*.

Figure 15:
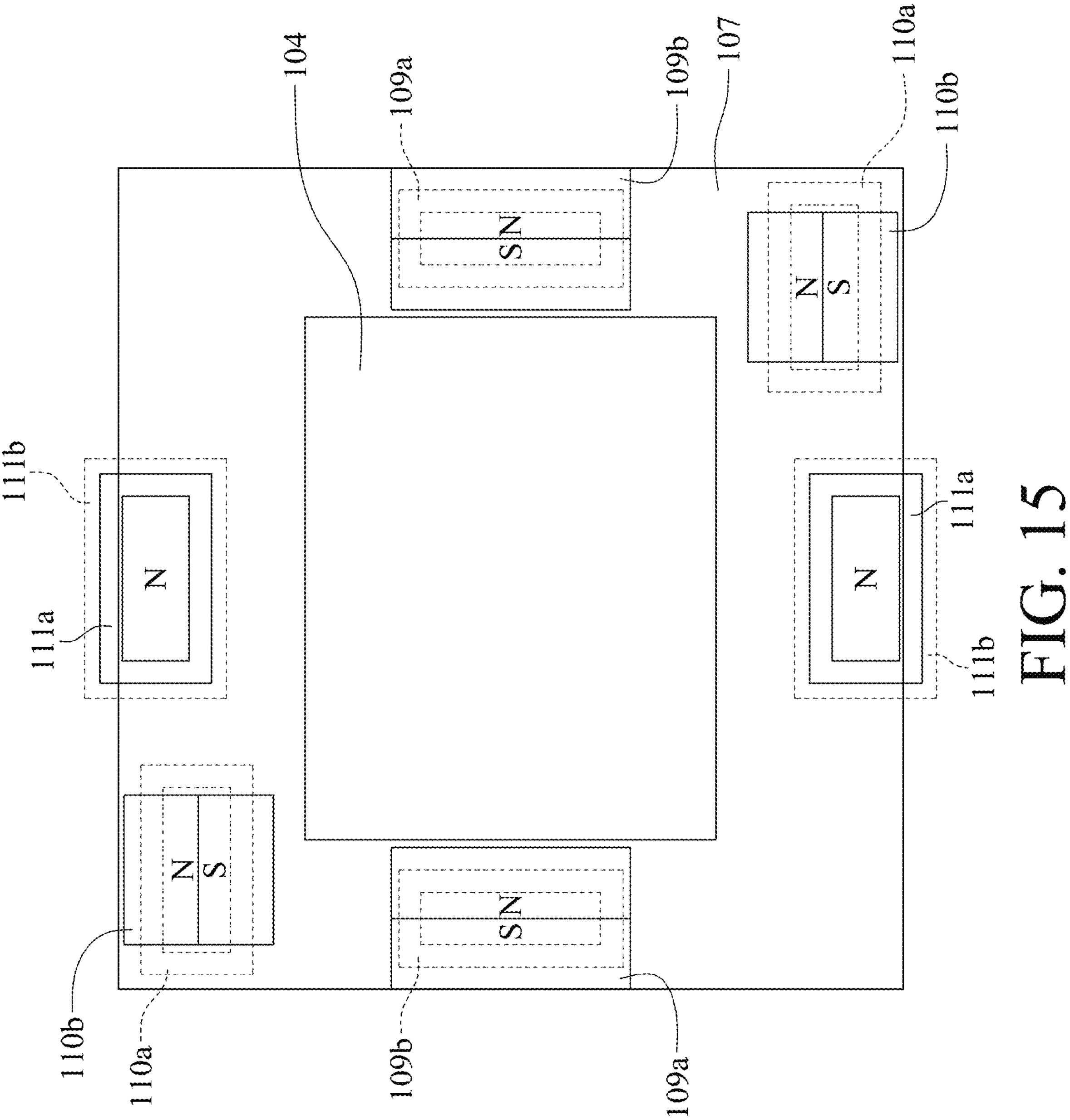
FIG. 15 is a schematic view of an arrangement of coils, magnets and an image sensor according to a fourth exemplary configuration of the present disclosure.

In the fourth exemplary configuration illustrated in FIG. 15, from the perspective of FIG. 15, two first magnets 109*b* are respectively disposed on the left side and the right side of the image sensor 104, two second magnets 110*b* are respectively disposed on the upper left side and the lower right side of the image sensor 104, and two third magnets 111*b* are respectively disposed on the upper side and the lower side of the image sensor 104. Two first coils 109*a* are respectively disposed corresponding to the two first magnets 109*b*, two second coils 110*a* are respectively disposed corresponding to the two second magnets 110*b*, and two third coils 111*a* are respectively disposed corresponding to the two third magnets 111*b*.

Figure 16:
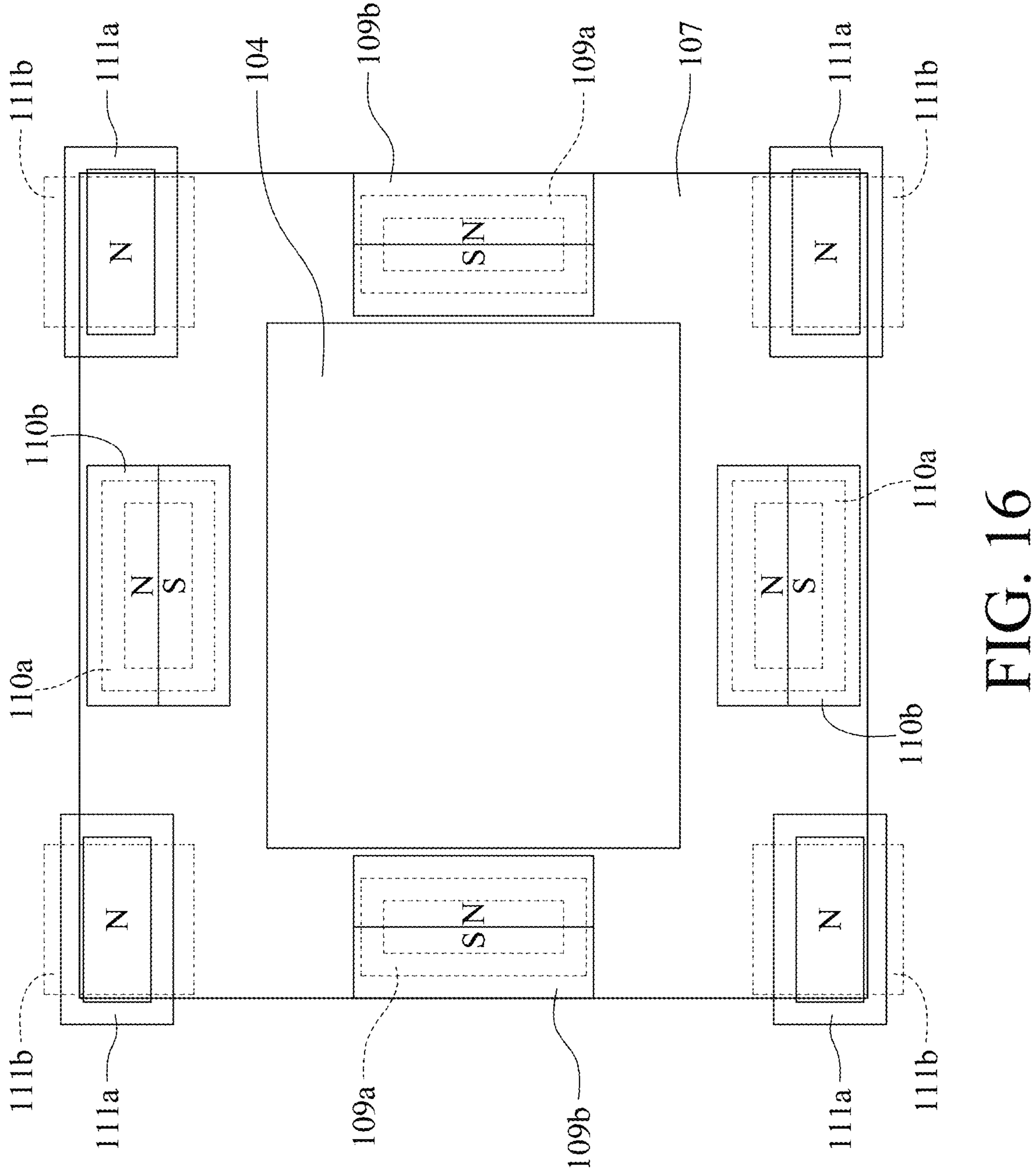
FIG. 16 is a schematic view of an arrangement of coils, magnets and an image sensor according to a fifth exemplary configuration of the present disclosure.

In the fifth exemplary configuration illustrated in FIG. 16, from the perspective of FIG. 16, two first magnets 109*b* are respectively disposed on the left side and the right side of the image sensor 104, two second magnets 110*b* are respectively disposed on the upper side and the lower side of the image sensor 104, and four third magnets 111*b* are respectively disposed on the upper left side, the lower left side, the upper right side and the lower right side of the image sensor 104. Two first coils 109*a* are respectively disposed corresponding to the two first magnets 109*b*, two second coils 110*a* are respectively disposed corresponding to the two second magnets 110*b*, and four third coils 111*a* are respectively disposed corresponding to the four third magnets 111*b*.

Figure 17:
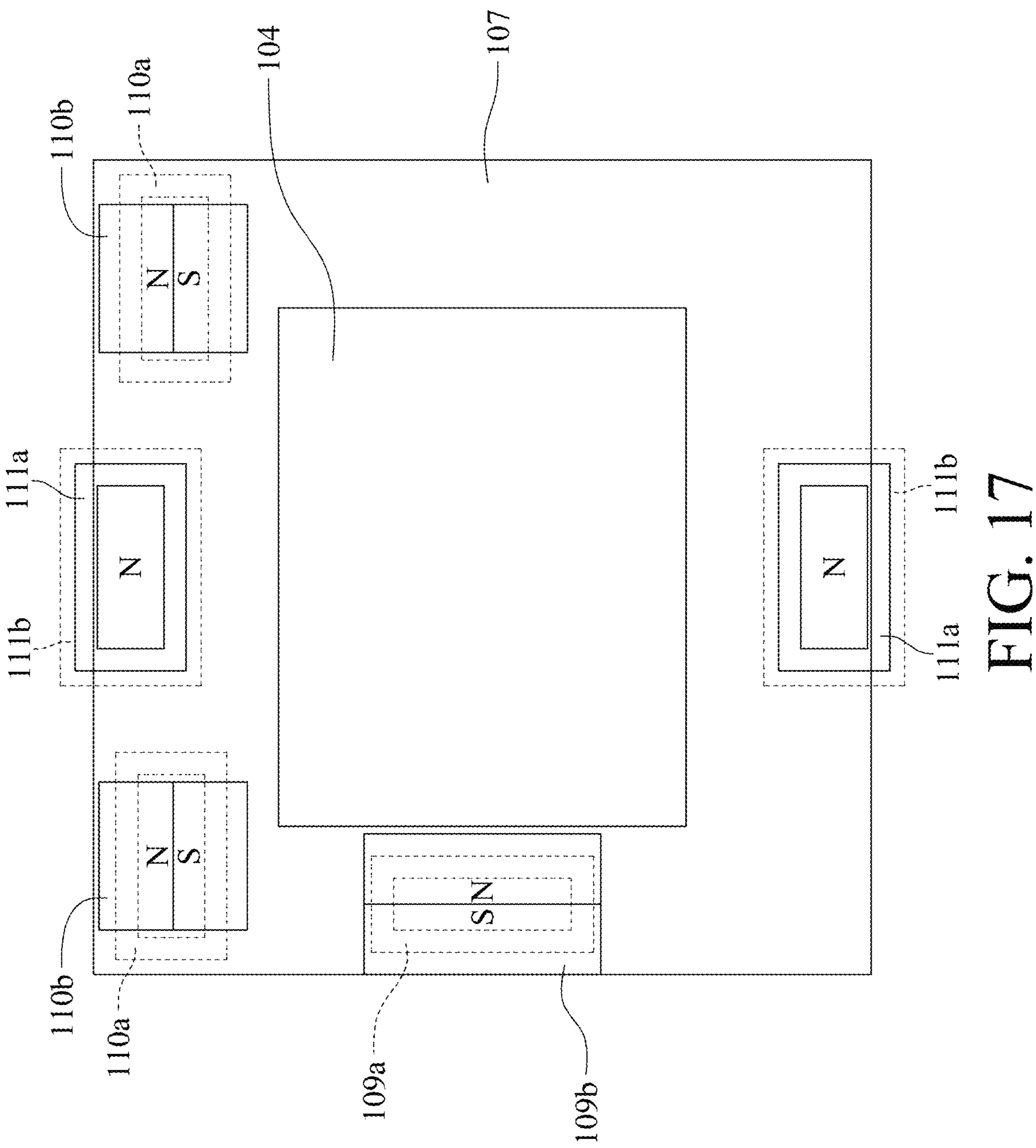
FIG. 17 is a schematic view of an arrangement of coils, magnets and an image sensor according to a sixth exemplary configuration of the present disclosure.

In the sixth exemplary configuration illustrated in FIG. 17, from the perspective of FIG. 1, one first magnet 109*b* is disposed on the left side of the image sensor 104, two second magnets 110*b* are respectively disposed on the upper left side and the upper right side of the image sensor 104, and two third magnets 111*b* are respectively disposed on the upper side and the lower side of the image sensor 104. One first coil 109*a* is disposed corresponding to the first magnet 109*b*, two second coils 110*a* are respectively disposed corresponding to the two second magnets 110*b*, and two third coils 111*a* are respectively disposed corresponding to the two third magnets 111*b*. In the exemplary configurations shown in FIG. 12 through FIG. 17, the first magnets 109*b*, the second magnets 110*b* and the third magnets 111*b* are disposed on the movable plate 107, the first coils 109*a* and the second coils 110*a* are disposed on the frame component 106, and the third coils 111*a* are disposed on the base 112, but the present disclosure is not limited thereto. For example, in some exemplary configurations of the present disclosure, one or more first coils, one or more second coils and one or more third coils are disposed on a movable plate, one or more first magnets and one or more second magnets are disposed on a frame component, and one or more third magnets are disposed on a base.

2nd Embodiment

Figure 18:
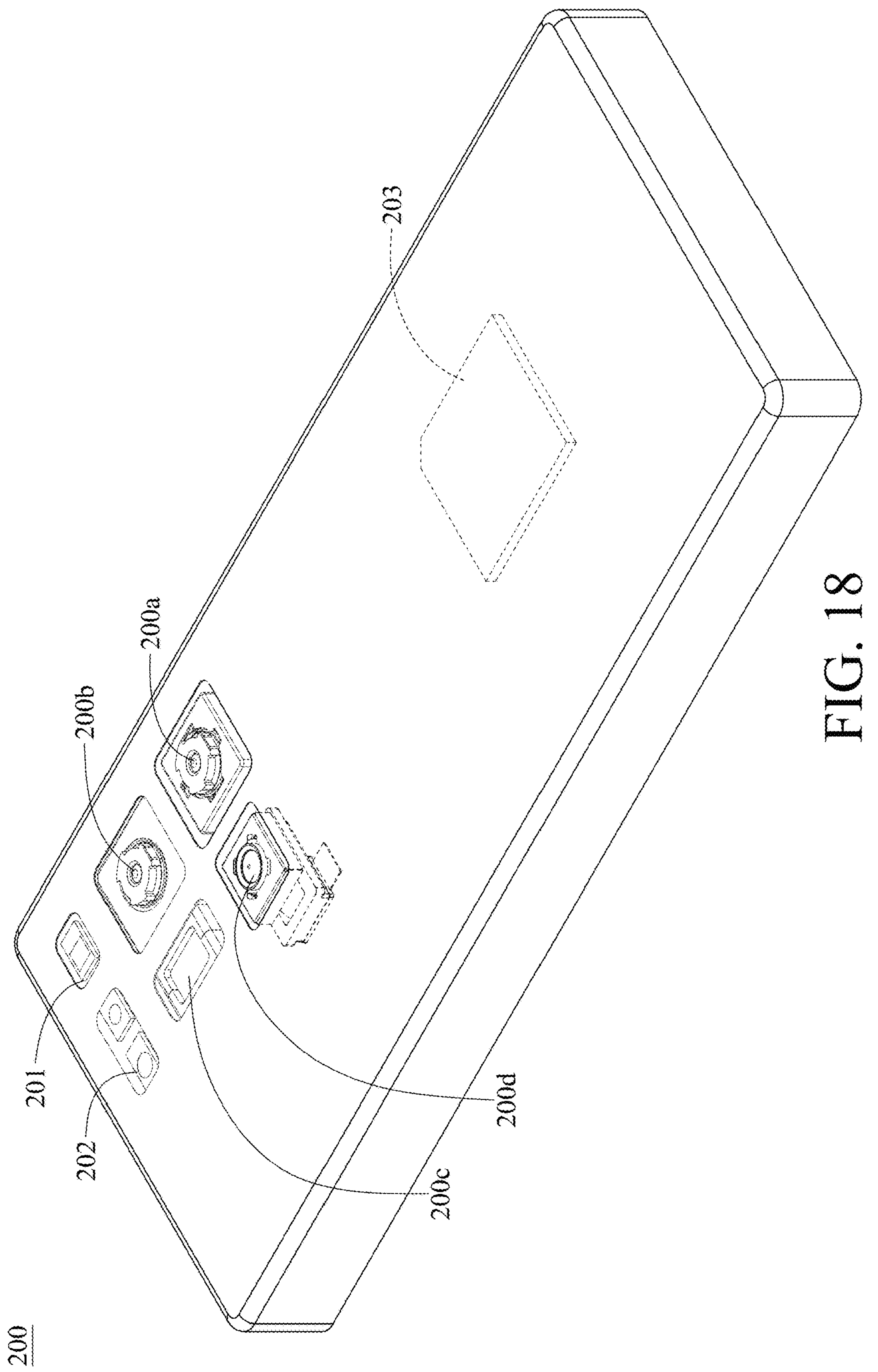
FIG. 18 is a perspective view of an electronic device according to the 2nd embodiment of the present disclosure.
Figure 19:
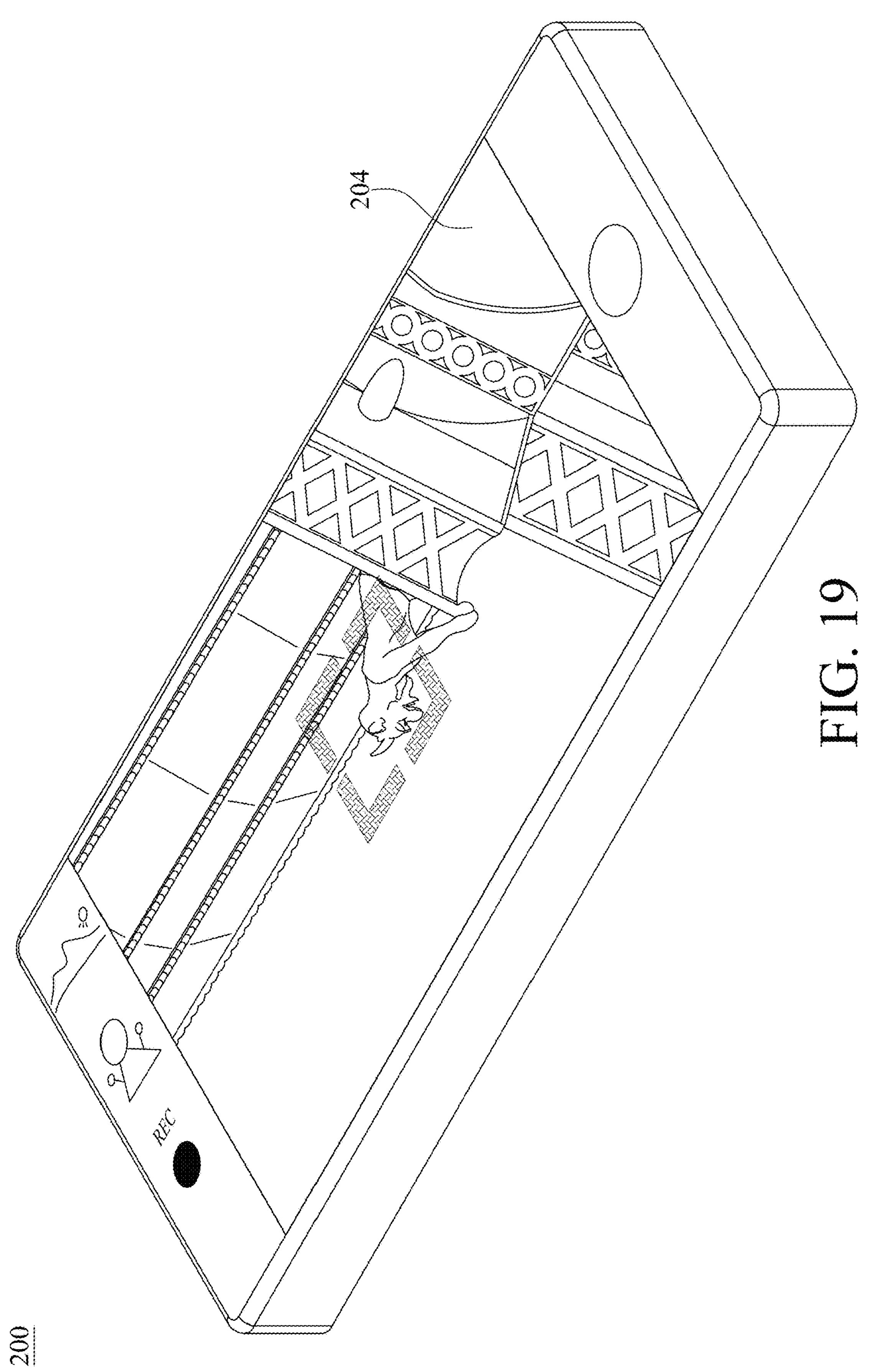
FIG. 19 is another perspective view of the electronic device in FIG. 18.

Please refer to FIG. 18 and FIG. 19. FIG. 18 is a perspective view of an electronic device according to the 2nd embodiment of the present disclosure, and FIG. 19 is another perspective view of the electronic device in FIG. 18.

In this embodiment, the electronic device 200 is a smartphone including a plurality of camera modules, a flash module 201, a focus assist module 202, an image signal processor 203, a display module (user interface) 204 and an image software processor (not shown).

These camera modules include an ultra-wide-angle camera module 200*a*, a high pixel camera module 200*b*, a telephoto camera module 200*c* and a telephoto camera module 200*d*. Moreover, the camera module 200*d* includes, for example, the imaging lens module 100 as disclosed in the 1st embodiment of the present disclosure, but the present disclosure is not limited thereto. At least one of the camera modules 200*a*, 200*b*, and 200*c* can include the imaging lens module of the present disclosure.

Figure 20:
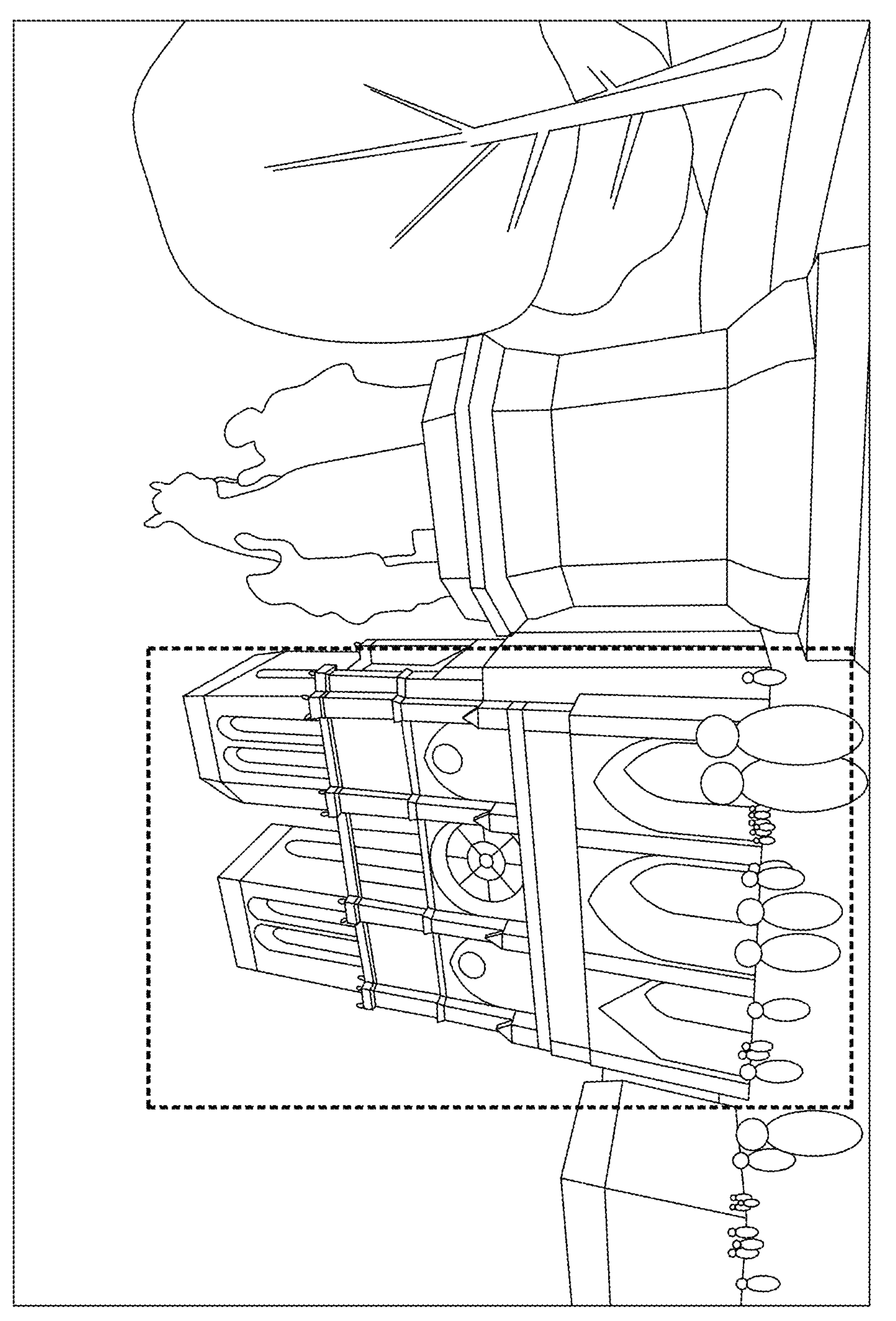
FIG. 20 is an illustration of an image captured by an ultra-wide-angle camera module.

The image captured by the ultra-wide-angle camera module 200*a* enjoys a feature of multiple imaged objects. FIG. 20 is an image captured by the ultra-wide-angle camera module 200*a*.

Figure 21:
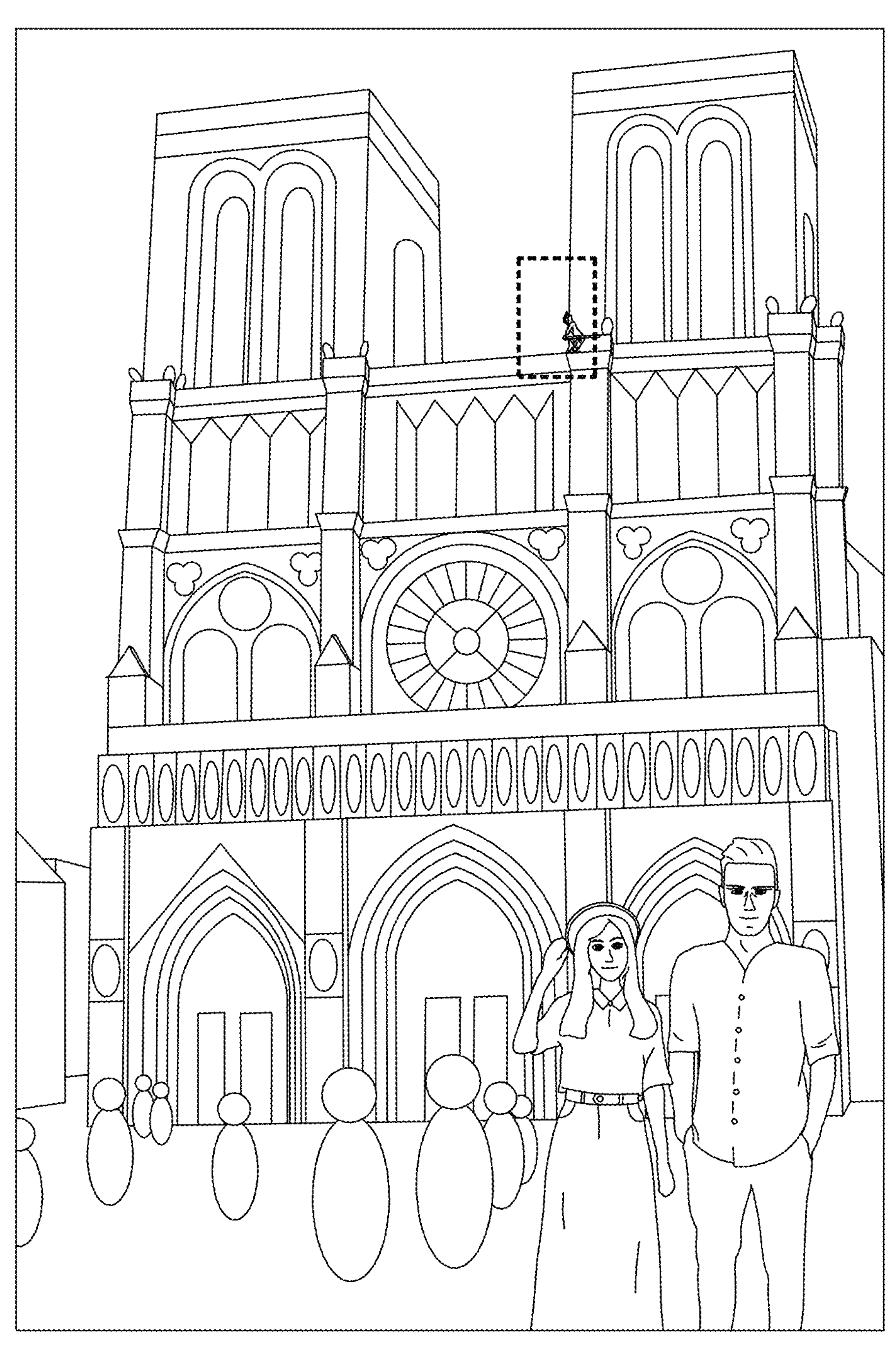
FIG. 21 is an illustration of an image captured by a high pixel camera module.

The image captured by the high pixel camera module 200*b* enjoys a feature of high resolution and less distortion, and the high pixel camera module 200*b* can capture part of the image in FIG. 20. FIG. 21 is an image captured by the high pixel camera module 200*b*.

Figure 22:
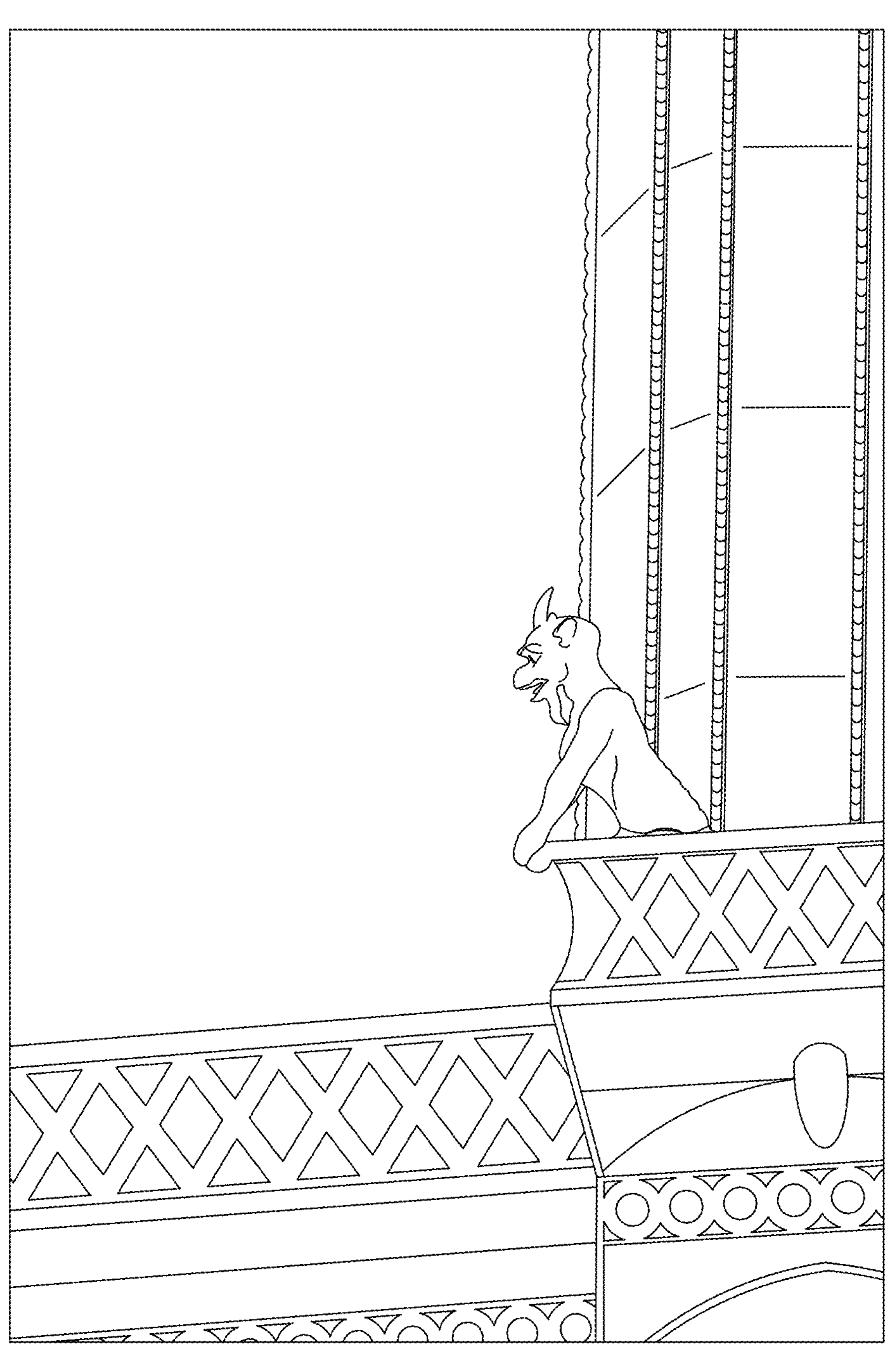
FIG. 22 is an illustration of an image captured by a telephoto camera module.

The image captured by the telephoto camera module 200*c* or the telephoto camera module 200*d* enjoys a feature of high optical magnification, and the telephoto camera module 200*c* or the telephoto camera module 200*d* can capture part of the image in FIG. 21. FIG. 22 is an image captured by the telephoto camera module 200*c* or the telephoto camera module 200*d*.

When a user captures images of an object, the light rays converge in the ultra-wide-angle camera module 200*a*, the high pixel camera module 200*b*, the telephoto camera module 200*c* or the telephoto camera module 200*d* to generate images, and the flash module 201 is activated for light supplement. The focus assist module 202 detects the object distance of the imaged object to achieve fast auto focusing. The image signal processor 203 is configured to optimize the captured image to improve image quality and provided zooming function. The light beam emitted from the focus assist module 202 can be either conventional infrared or laser. The display module 204 can include a touch screen, and the user is able to interact with the display module 204 to adjust the angle of view and switch between different camera modules, and the image software processor having multiple functions to capture images and complete image processing. Alternatively, the user may capture images via a physical button. The image processed by the image software processor can be displayed on the display module 204.

3rd Embodiment

Figure 23:
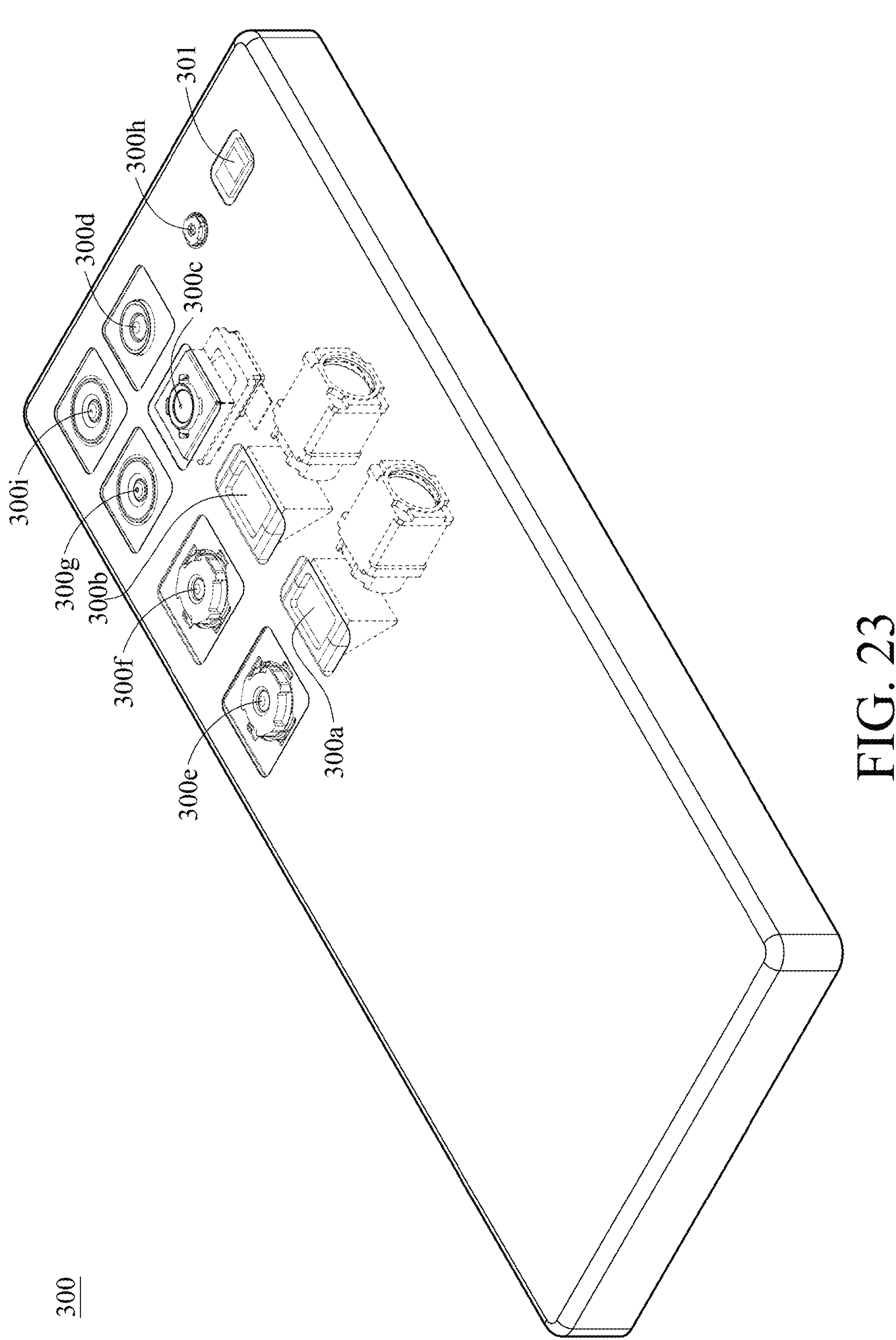
FIG. 23 is a perspective view of an electronic device according to the 3rd embodiment of the present disclosure.

Please refer to FIG. 23, which is a perspective view of an electronic device according to the 3rd embodiment of the present disclosure.

In this embodiment, the electronic device 300 is a smartphone including a camera module 300*a*, a camera module 300*b*, a camera module 300*c*, a camera module 300*d*, a camera module 300*e*, a camera module 300*f*, a camera module 300*g*, a camera module 300*h*, a camera module 300*i*, a flash module 301, an image signal processor, a display module and an image software processor (not shown). The camera module 300*a*, the camera module 300*b*, the camera module 300*c*, the camera module 300*d*, the camera module 300*e*, the camera module 300*f*, the camera module 300*g*, the camera module 300*h* and the camera module 300*i* are disposed on the same side of the electronic device 300, while the display module is disposed on the opposite side of the electronic device 300. Moreover, the camera module 300*c* includes, for example, the imaging lens module 100 as disclosed in the 1st embodiment of the present disclosure, but the present disclosure is not limited thereto. At least one of the camera modules 300*a*, 300*b*, 300*d*, 300*e*, 300*f*, 300*g*, 300*h*, and 300*i* can include the imaging lens module of the present disclosure.

The camera module 300*a* is a telephoto camera module, the camera module 300*b* is a telephoto camera module, the camera module 300*c* is a telephoto camera module, the camera module 300*d* is a telephoto camera module, the camera module 300*e* is a wide-angle camera module, the camera module 300*f* is a wide-angle camera module, the camera module 300*g* is a ultra-wide-angle camera module, the camera module 300*h* is a ToF (time of flight) camera module, and the camera module 300*i* is an ultra-wide-angle camera module. In this embodiment, the camera module 300*i*, the camera module 300*a*, the camera module 300*b*, the camera module 300*c*, the camera module 300*d*, the camera module 300*e*, the camera module 300*f* and the camera module 300*g* have different fields of view, such that the electronic device 300 can have various magnification ratios so as to meet the requirement of optical zoom functionality. In addition, the camera module 300*a* and camera module 300*b* are telephoto camera modules having a light-folding element configuration. In addition, the camera module 300*h* can determine depth information of the imaged object. In this embodiment, the electronic device 300 includes multiple camera modules 300*a*, 300*b*, 300*c*, 300*d*, 300*e*, 300*f*, 300*g*, 300*h*, and 300*i*, but the present disclosure is not limited to the number and arrangement of camera modules. When a user captures images of an object, the light rays converge in the camera module 300*a*, the camera module 300*b*, the camera module 300*c*, the camera module 300*d*, the camera module 300*e*, the camera module 300*f*, the camera module 300*g*, the camera module 300*h* or the camera module 300*i* to generate an image(s), and the flash module 301 is activated for light supplement. Further, the subsequent processes are performed in a manner similar to the abovementioned embodiments, so the details in this regard will not be provided again.

4th Embodiment

Figure 24:
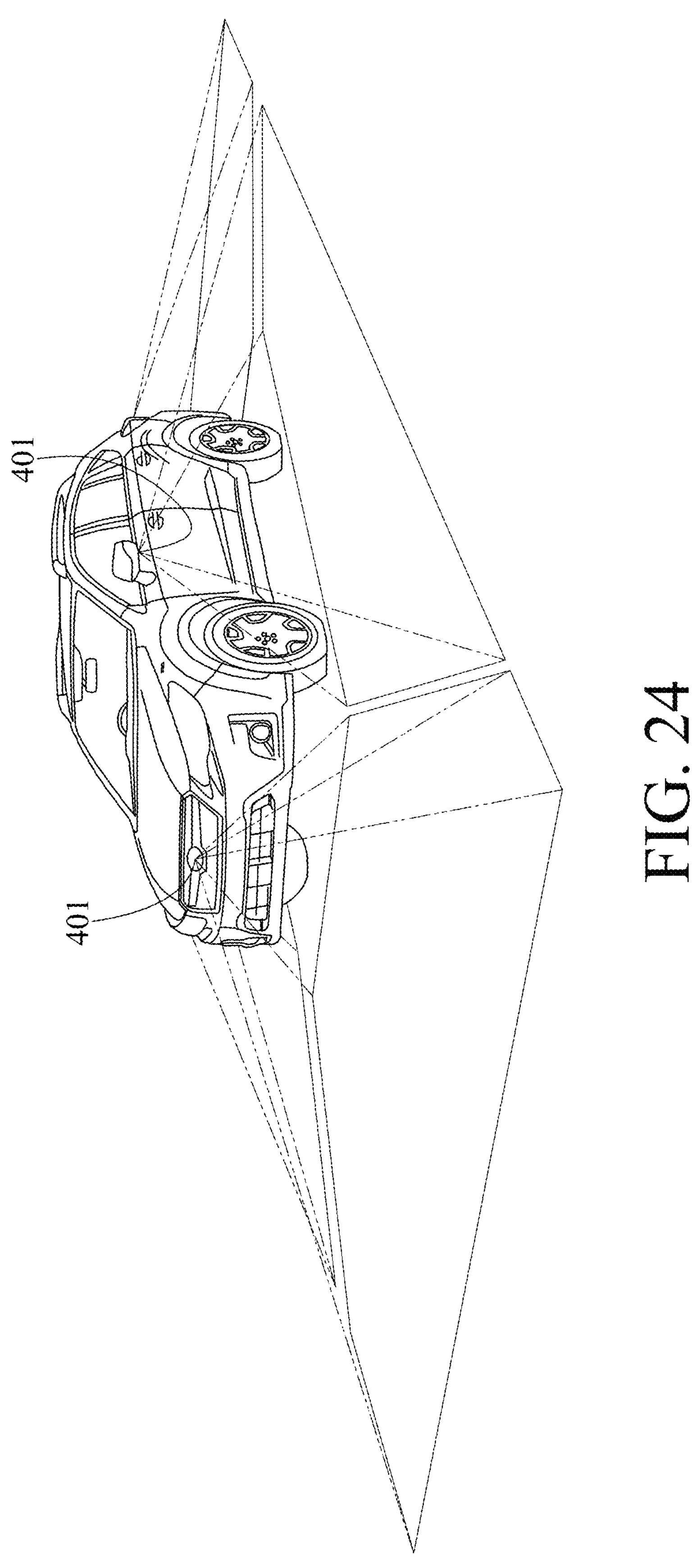
FIG. 24 is a perspective view of an electronic device according to the 4th embodiment of the present disclosure.
Figure 25:
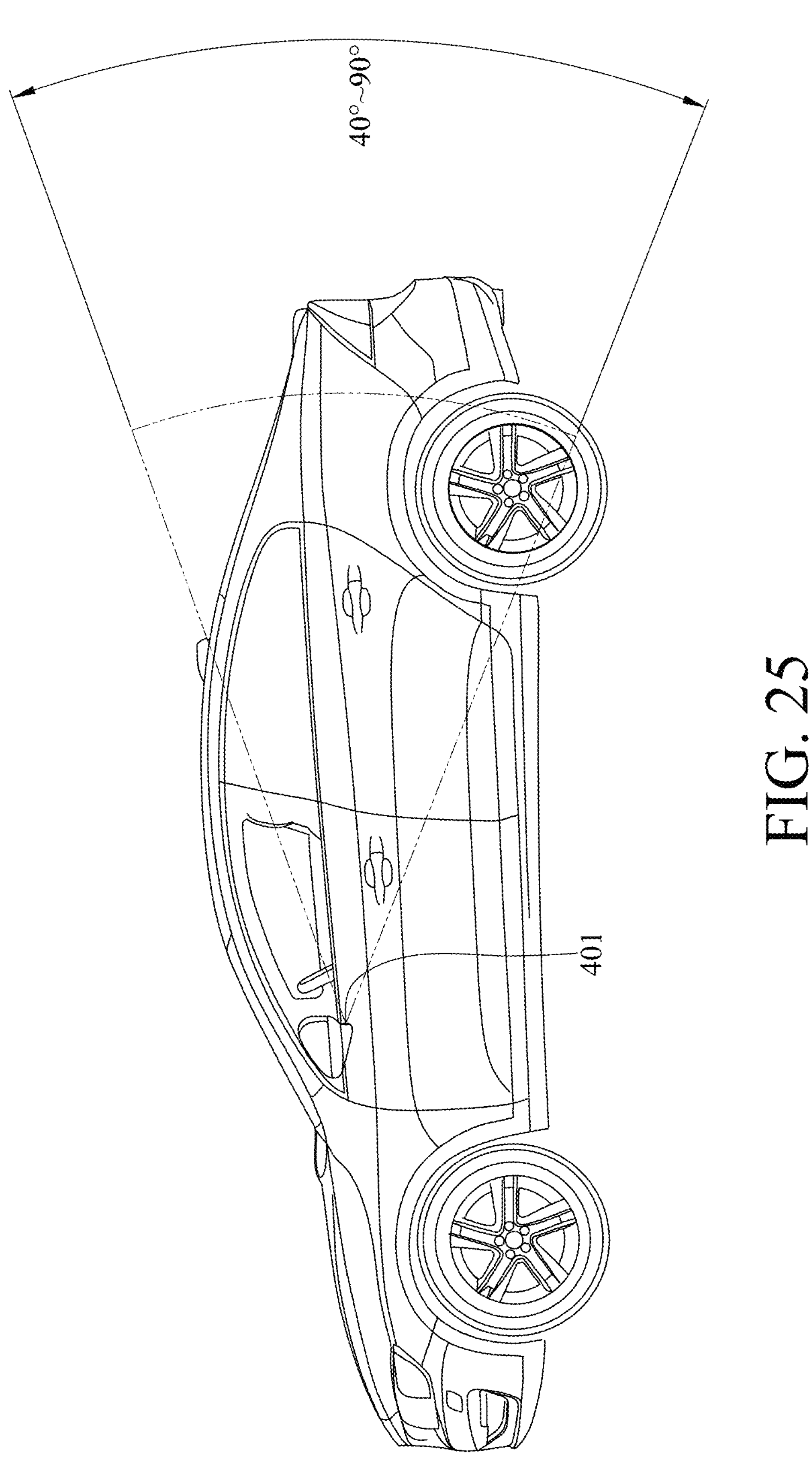
FIG. 25 is a side view of the electronic device in FIG. 24.
Figure 26:
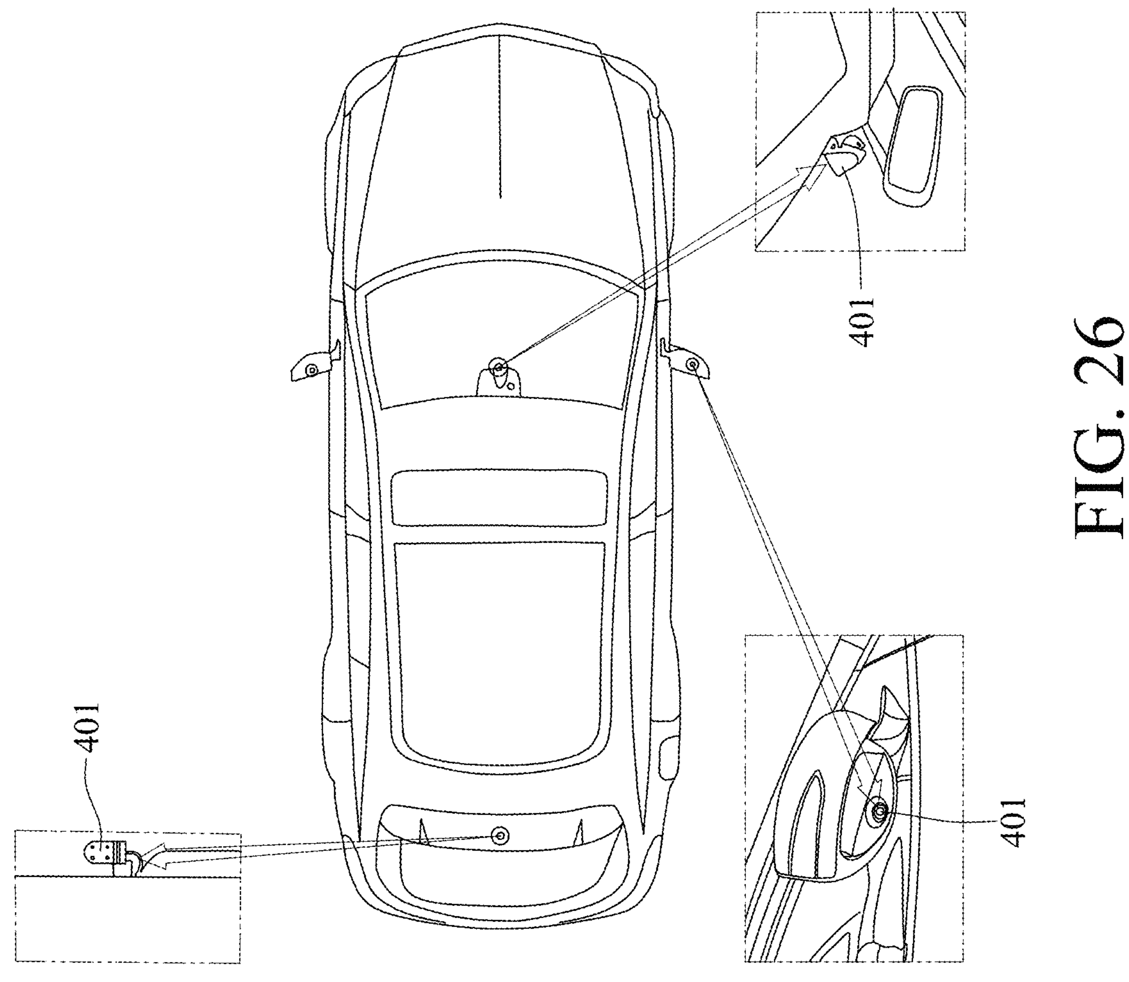
FIG. 26 is a top view of the electronic device in FIG. 24.

Please refer to FIG. 24 to FIG. 26. FIG. 24 is a perspective view of an electronic device according to the 4th embodiment of the present disclosure, FIG. 25 is a side view of the electronic device in FIG. 24, and FIG. 26 is a top view of the electronic device in FIG. 24.

In this embodiment, the electronic device 400 is an automobile. The electronic device 400 includes a plurality of automotive camera module 401, and the camera modules 401 each include the imaging lens module of the present disclosure. The camera modules 401 can serve as, for example, panoramic view car cameras, dashboard cameras and vehicle backup cameras.

As shown in FIG. 24, the camera modules 401 are, for example, disposed around the automobile to capture peripheral images of the automobile, which is favorable for obtaining external traffic information so as to achieve autopilot function. In addition, the image software processor may stitch the peripheral images into one panoramic view image for the driver's checking every corner surrounding the automobile, thereby favorable for parking and driving.

As shown in FIG. 25, the camera modules 401 are, for example, respectively disposed on the lower portion of the side mirrors. A maximum field of view of the camera modules 401 can be 40 degrees to 90 degrees for capturing images in regions on left and right lanes.

As shown in FIG. 26, the camera modules 401 can also be, for example, respectively disposed on the lower portion of the side mirrors and inside the front and rear windshields for providing external information to the driver, and also providing more viewing angles so as to reduce blind spots, thereby improving driving safety.

The smartphones, panoramic view car cameras, dashboard cameras and vehicle backup cameras in the embodiments are only exemplary for showing the imaging lens module of the present disclosure installed in an electronic device, and the present disclosure is not limited thereto. The imaging lens module can be optionally applied to optical systems with a movable focus. Furthermore, the imaging lens module features good capability in aberration corrections and high image quality, and can be applied to 3D (three-dimensional) image capturing applications, in products such as digital cameras, mobile devices, digital tablets, smart televisions, network surveillance devices, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens module comprising:

an optical component having an optical axis;

an image sensor disposed corresponding to the optical component along the optical axis;

a first driving part configured to drive the image sensor to move in a first direction perpendicular to the optical axis, and the first driving part comprising:

at least one first coil; and at least one first magnet disposed corresponding to the at least one first coil;

a second driving part configured to drive the image sensor to move in a second direction perpendicular to the optical axis, the second direction being different from the first direction, and the second driving part comprising:

at least one second coil; and at least one second magnet disposed corresponding to the at least one second coil;

a third driving part configured to drive the image sensor to move in a direction parallel to the optical axis, and the third driving part comprising:

at least one third coil; and at least one third magnet disposed corresponding to the at least one third coil in the direction parallel to the optical axis; and a base, wherein the base and the optical component correspond and are fixedly installed to each other;

wherein the first driving part and the second driving part are configured to cooperate to drive the image sensor to rotate around the optical axis, a most image-side surface of the optical component has an intersection point with the optical axis, a distance in parallel with the optical axis between a central point of the at least one first magnet and the intersection point is h1, a distance in parallel with the optical axis between a central point of the at least one second magnet and the intersection point is h2, a distance in parallel with the optical axis between a central point of the at least one third magnet and the intersection point is h3, and the following condition is satisfied:

$$0 \leq h1 = h2 < h3.$$

2. The imaging lens module of claim 1, further comprising:

a frame component holding the image sensor; and a movable plate disposed corresponding to the frame component and the base.

3. The imaging lens module of claim 2, wherein the movable plate has at least one first side wall, and the at least one first side wall comprises at least one first recess, and the base has at least one second side wall, the at least one second side wall comprises at least one second recess, the at least one first recess is disposed corresponding to the at least one second recess, and the at least one first recess and the at least one second recess together form a track parallel to the optical axis.

4. The imaging lens module of claim 3, wherein the third driving part further comprises:

at least one autofocus rolling member disposed between the movable plate and the base, allowing the movable plate to move relative to the base, wherein the at least one autofocus rolling member is movably disposed in the track in the direction parallel to the optical axis, and the third driving part is configured to drive the movable plate to move relative to the optical component in the direction parallel to the optical axis.

5. The imaging lens module of claim 2, wherein the first driving part and the second driving part further comprise:

at least one image stabilization rolling member disposed between the frame component and the movable plate, allowing the frame component to move relative to the movable plate, wherein the first driving part and the second driving part are configured to drive the frame component and the image sensor to translate and rotate relative to the optical component in directions perpendicular to the optical axis.

6. The imaging lens module of claim 5, wherein the frame component comprises at least one third recess, the movable plate comprises at least one flat support structure, the at least one third recess is disposed corresponding to the at least one flat support structure, the at least one image stabilization rolling member is disposed between the at least one third recess and the at least one flat support structure, and the at least one image stabilization rolling member is configured to translate and rotate on the at least one flat support structure in the directions perpendicular to the optical axis.

7. The imaging lens module of claim 1, further comprising:

a barrel accommodating the optical component; and a casing mechanically mounted to the barrel, and the casing is assembled to the base.

8. The imaging lens module of claim 7, wherein the barrel and the casing are formed of a single piece.

9. The imaging lens module of claim 1, wherein a back focal length of the optical component is BFL, the distance in parallel with the optical axis between the central point of the at least one third magnet and the intersection point is h3, and the following condition is satisfied:

$$BFL<h3.$$

10. The imaging lens module of claim 1, further comprising:

a flexible circuit board electrically connected to the image sensor, wherein the flexible circuit board comprises at least one bend portion, and the at least one bend portion is a bent part on the flexible circuit board that forms an angle.

11. An electronic device comprising:

the imaging lens module of claim 1.

12. An imaging lens module comprising:

an optical component having an optical axis;

an image sensor disposed corresponding to the optical component along the optical axis;

a first driving part configured to drive the image sensor to move in a first direction perpendicular to the optical axis, and the first driving part comprising:

at least one first coil; and at least one first magnet disposed corresponding to the at least one first coil;

a second driving part configured to drive the image sensor to move in a second direction perpendicular to the optical axis, the second direction being different from the first direction, and the second driving part comprising:

at least one second coil; and at least one second magnet disposed corresponding to the at least one second coil;

a third driving part configured to drive the image sensor to move in a direction parallel to the optical axis, and the third driving part comprising:

at least one third coil; and at least one third magnet disposed corresponding to the at least one third coil in the direction parallel to the optical axis; and a movable plate, wherein the at least one first magnet, the at least one second magnet and the at least one third magnet are disposed on the movable plate, and the third driving part is configured to drive the movable plate to move in the direction parallel to the optical axis; and a base, wherein the base and the optical component correspond and are fixedly installed to each other, and the at least one third coil is disposed on the base;

wherein the first driving part and the second driving part are configured to cooperate to drive the image sensor to rotate around the optical axis, a most image-side surface of the optical component has an intersection point with the optical axis, a distance in parallel with the optical axis between a central point of the at least one third magnet and the intersection point is h3, a back focal length of the optical component is BFL, and the following condition is satisfied:

$$BFL<h3.$$

13. The imaging lens module of claim 12, further comprising:

a frame component holding the image sensor, wherein the frame component is disposed corresponding to the movable plate.

14. The imaging lens module of claim 13, wherein the movable plate has at least one first side wall, and the at least one first side wall comprises at least one first recess, and the base has at least one second side wall, the at least one second side wall comprises at least one second recess, the movable plate is disposed corresponding to the base, the at least one first recess is disposed corresponding to the at least one second recess, and the at least one first recess and the at least one second recess together form a track parallel to the optical axis.

15. The imaging lens module of claim 14, wherein the third driving part further comprises:

at least one autofocus rolling member disposed between the movable plate and the base, allowing the movable plate to move relative to the base, wherein the at least one autofocus rolling member is movably disposed in the track in the direction parallel to the optical axis, and the third driving part is configured to drive the movable plate to move relative to the optical component in the direction parallel to the optical axis.

16. The imaging lens module of claim 13, wherein the first driving part and the second driving part further comprise:

at least one image stabilization rolling member disposed between the frame component and the movable plate, allowing the frame component to move relative to the movable plate, wherein the first driving part and the second driving part are configured to drive the frame component and the image sensor to translate and rotate relative to the optical component in directions perpendicular to the optical axis.

17. The imaging lens module of claim 16, wherein the frame component comprises at least one third recess, the movable plate comprises at least one flat support structure, the at least one third recess is disposed corresponding to the at least one flat support structure, the at least one image stabilization rolling member is disposed between the at least one third recess and the at least one flat support structure, and the at least one image stabilization rolling member is configured to translate and rotate on the at least one flat support structure in the directions perpendicular to the optical axis.

18. The imaging lens module of claim 12, further comprising:

a barrel accommodating the optical component; and a casing mechanically mounted to the barrel, and the casing is assembled to the base.

19. The imaging lens module of claim 18, wherein the barrel and the casing are formed of a single piece.

20. The imaging lens module of claim 12, wherein a distance in parallel with the optical axis between a central point of the at least one first magnet and the intersection point is h1, a distance in parallel with the optical axis between a central point of the at least one second magnet and the intersection point is h2, the distance in parallel with the optical axis between the central point of the at least one third magnet and the intersection point is h3, and the following condition is satisfied:

$$0 \leq h1 = h2 < h3.$$

21. The imaging lens module of claim 12, further comprising:

a flexible circuit board electrically connected to the image sensor, wherein the flexible circuit board comprises at least one bend portion, and the at least one bend portion is a bent part on the flexible circuit board that forms an angle.

22. An electronic device comprising:
the imaging lens module of claim 12.

* * * * *